United States Patent [19]

Tsutsui et al.

[11] Patent Number: 5,414,795
[45] Date of Patent: May 9, 1995

[54] HIGH EFFICIENCY DIGITAL DATA ENCODING AND DECODING APPARATUS

[75] Inventors: Kyoya Tsutsui; Osamu Shimoyoshi, both of Kanagawa, Japan

[73] Assignee: Sony Corporation, Japan

[21] Appl. No.: 857,772

[22] Filed: Mar. 26, 1992

[30] Foreign Application Priority Data

Mar. 29, 1991 [JP] Japan ............... 3-091183
Mar. 29, 1991 [JP] Japan ............... 3-091185

[51] Int. Cl.[6] ............................................. G10L 9/00
[52] U.S. Cl. ............................... 395/2.13; 395/2.38; 395/2.39
[58] Field of Search ........................ 381/29–49; 395/2, 2.12, 2.13, 2.14, 2.38, 2.39

[56] References Cited

U.S. PATENT DOCUMENTS

| | | | |
|---|---|---|---|
| 4,184,049 | 1/1980 | Crochiere et al. | 381/31 |
| 4,896,362 | 1/1990 | Veldhuis et al. | 381/41 |
| 4,932,062 | 6/1990 | Hamilton | 381/46 |
| 5,109,417 | 4/1992 | Fielder | 381/29 |
| 5,115,240 | 5/1992 | Fujiwara et al. | 381/37 |
| 5,151,941 | 9/1992 | Nishiguchi et al. | 381/46 |
| 5,157,760 | 10/1992 | Akagiri | 395/2 |
| 5,159,611 | 10/1992 | Tomita et al. | 381/30 |
| 5,241,603 | 8/1993 | Akagiri et al. | 381/37 |

FOREIGN PATENT DOCUMENTS

0370277A2-/A3 10/1989 Germany ............ H04B 1/66
WO90/09064 8/1990 WIPO ............ H04B 1/66

Primary Examiner—Allen R. MacDonald
Assistant Examiner—Michelle Doerrler
Attorney, Agent, or Firm—Ian Hardcastle; Limbach & Limbach

[57] ABSTRACT

An apparatus for compressing a digital input signal compresses a digital input signal arranged into frames of plural samples. The digital input signal is orthogonally transformed by plural orthogonal transform circuits in blocks derived by dividing the frames by a different divisor in each circuit. The resulting spectral coefficients are quantized using an adaptive number of bits. The output of one orthogonal transform circuit is selected based on the outputs of the orthogonal transform circuits. The digital input signal is divided into plural frequency ranges, and frames are formed in each range. A block length decision circuit determines division of the frames of each range signal into blocks in response to range signal dynamics. The range signals are orthogonally transformed in blocks and the spectral coefficients are quantized. The apparatus also includes a frequency analyzing circuit that derives spectral data points from the input data, and groups them in plural bands. A noise level setting circuit finds the energy in each band and sets a allowable noise level in response to the band energy. A block floating coefficient calculating circuit calculates block floating coefficients based on the maximum spectral data point in each band. A quantizing bit number decision circuit determines the number of bits to use for quantizing in response to the allowable noise level and the block floating coefficients. A quantizing circuit quantizes the spectral data points in response to the quantizing bit number decision circuit.

29 Claims, 15 Drawing Sheets

HIGH EFFICIENCY DIGITAL DATA ENCODING AND DECODING APPARATUS

BACKGROUND OF THE INVENTION

This invention relates to an apparatus and method for compressing a digital input signal to provide a compressed signal for storing in a medium or for transmission, and to an apparatus for complementarily expanding the compressed signal to provide a digital output signal.

There are a variety methods for compressing audio or voice signals. These methods include, for example, sub-band coding (SBC) in which audio signals etc. are divided on the frequency axis into plural frequency bands for quantizing. In adaptive transform coding (ATC), signals on the time axis are converted into signals on the frequency axis by an orthogonal transform to provide plural spectral coefficients that are then quantized. In adaptive bit allocation (APC-AB), SBC is combined with adaptive predictive coding (APC). Signals on the time axis are divided into plural frequency bands, the band signals are converted into base band signals, and plural orders of linear predictive analyses are performed to provide predictive coding.

In sub-band coding, for example, after the signals are divided into plural frequency bands, the signals of each band are converted into signals on the frequency axis by an orthogonal transform, after which quantizing is carried out for each band. In effecting the orthogonal transform, the input audio signals may be grouped into blocks at an interval of a predetermined unit of time, and a discrete cosine transform (DCT) is carried out for each block to convert the signal on the time axis into a signal on the frequency axis. In carrying out the division into plural frequency bands, certain characteristics of the human auditory sense may be taken into account. Thus, the audio signal may be divided into plural frequency bands, for example, into 25 bands having a bandwidth that increases with increasing frequency. Such bands are known as critical bands. In sub-band coding, the number of quantizing bits accorded to each frequency band is dynamically or adaptively changed, to raise the amount of data compression while maintaining the number of bits per unit time, i.e., the bit rate, constant.

For example, when quantizing the DCT coefficients from the DCT processing operation using bit allocation, the DCT coefficients in each frequency band resulting from the DCT processing operation carried out on each block are quantized using a dynamically-allocated number of bits.

To provide a greater degree of compression, techniques are used that take advantage of the masking effect, which takes into account certain characteristics of the human auditory sense. The masking effect is a phenomenon in which certain signals are masked, and hence rendered inaudible, by other signals. Thus noise below the masking level is allowable. The masking effect may be taken into account so that fewer quantizing bits are allocated to signal components below the allowable noise level, which reduces the bit rate.

If, with the above compression techniques, the input audio signal is divided into plural frequency ranges, and an orthogonal transform, such as a DCT, is carried out in each frequency range, that is, if frequency analyses are performed for each frequency range, the signal in each frequency range is divided into frames at an interval of predetermined unit of time, and a orthogonal transform is effected for each frame for each frequency range.

Alternatively, the spectral coefficients (e.g., DCT coefficients) produced by the orthogonal transform are quantized and the number of quantizing bits is allocated on a frame-by-frame basis.

The input audio signal is not necessarily static and substantially free from fluctuations in level. The signal can behave dynamically in many ways. For example, the signal dynamics may change transiently, such that the peak level of the signal changes significantly within a frame. For example, a signal representing the sound of a percussion instrument can change in this way.

If an audio signal that changes from static to transient or vice versa is processed solely by orthogonally transforming a complete frame, and the resulting spectral coefficients are quantized, the quantizing may not be suited to the signal dynamics, so that the sound quality perceived by the listener after the compressed signal has been expanded and reproduced may not be optimum.

When quantizing is performed using the allowable noise level, the number of bits allocated for quantizing is determined based on the ratio (or difference) of the energy in the frequency band and the allowable noise level corresponding to the masking level resulting from the energy in the frequency band.

However, among audio signals, there are signals having the character of a single tone. Such signals are said to have high tonality. If a signal has high tonality, quantizing bit allocation based on the energy in the frequency bands cannot be calculated accurately. That is, the energy within a given frequency band may not change between when the signal is highly tonal and when it is not. In such a case, it is not desirable to base the quantizing bit allocation on the band energy despite the fact that the characteristics of the data are different between the frequency bands. Because an accurate bit allocation cannot be made for the high tonality signals, the sound quality is reduced. That is, despite the fact that a large number of bits are required to quantize a high tonality signal, the previously known techniques are unable to allocate the required number of bits to these signals if they calculate the number of bits based on the band energy. This leads to a deterioration in the signal quality.

In view of the above-depicted state of the art, it is an object of the present invention to provide an apparatus for compressing a digital input signal in which compression more adaptive to the properties or characteristics of the input audio signal may be achieved, and in which the compressed signal, after expansion and reproduction, is better adapted to the human auditory sense.

It is another object of the present invention to provide an apparatus for compressing a digital input signal in which satisfactory bit allocation may be achieved even with high tonality signals to improve the sound quality.

SUMMARY OF THE INVENTION

A first aspect of the invention provides an apparatus for compressing a digital input signal divided into frames of plural samples to provide a compressed signal. The apparatus comprises plural orthogonal transform circuits that orthogonally transform the digital input signal in blocks derived by dividing each frame by a divisor. Each orthogonal transform circuit derives spectral coefficients from the digital input signal, quantizes the spectral coefficients using an adaptively-determined number of bits, and provides the quantized spectral coefficients as an output signal. Each orthogonal transform circuit transforms the digital input signal in blocks derived by dividing by a different divisor. The apparatus also includes a circuit that selects the output signal from one of the orthogonal transform circuits as the compressed signal in response to a selection signal from each of the orthogonal transform circuits.

The digital input signal supplied to each orthogonal transform circuit may be divided into plural frequency ranges. The orthogonal transform may be, for example, a discrete cosine transform (DCT) or fast Fourier transform (FFT). In this case, it is the spectral coefficients produced by the transform that is quantized.

In selecting the orthogonal transform circuit output signal, the output signal from the one orthogonal transform circuit is selected which requires the least number of bits for quantizing the spectral coefficients (i.e., the number of bits required to provide a predetermined sound quality). Of course, the frame-by-frame number of bits generated by the orthogonal transform circuit after the spectral coefficients resulting from the orthogonal transform has been quantized is a predetermined number determined by the output bit rate. However, since adaptive bit allocation is achieved during quantizing, the number of bits actually required for quantizing may be different from the predetermined number of bits. Therefore, if the actual number of bits required for quantizing is less than the predetermined number of bits, the remaining, unused bits may be used to improve the quality of the quantizing (i.e., to realize a sound quality better than the predetermined sound quality). Thus, by selecting the output of the orthogonal transform circuit that requires the least number of quantizing bits, an optimally quantized output may be produced.

On the other hand, if the number of quantizing bits required is larger than the predetermined number of bits, selecting the output of the orthogonal transform circuit requiring the least number of quantizing bits will provide an output that will suffer the least degradation as a result of having to remove quantizing bits to satisfy the requirements imposed by the predetermined number of bits.

A second aspect of the invention provides an apparatus for compressing a digital input signal to provide a compressed signal. The apparatus comprises a circuit that divides the digital input signal into plural frequency ranges to provide plural frequency range signals. Each frequency range signal is arranged into frames composed of plural samples. A block length decision circuit determines a division of each frame of each frequency range signal into at least one block in response to a dynamic characteristic of each respective frequency range signal. An orthogonal transform circuit orthogonally transforms each frequency range signal to produce spectral coefficients. The orthogonal transform circuit transforms each frequency range signal in blocks determined by the block length decision circuit. Finally, the apparatus includes a circuit that quantizes the spectral coefficients.

A third aspect of the invention provides an apparatus for compressing a digital input signal. The apparatus comprises a frequency analyzing circuit that frequency analyzes the digital input signal to provide plural spectral data points and forms the spectral data points into plural bands. An allowable noise level setting circuit determines an energy for each band, and sets an allowable noise level in response to the energy in each band. A block floating coefficient calculating circuit calculates a block floating coefficient in response to a maximum spectral data point in each band. A quantizing bit number decision circuit determines a number of quantizing bits in response to the allowable noise level and the block floating coefficient. Finally, a quantizing circuit quantizes the spectral data points from the frequency analyzing circuit using the number of quantizing bits determined by the quantizing bit number decision circuit.

Among the characteristics or properties of the frames or blocks of the digital input signal prior to orthogonal transform, there are the dynamic properties of the signal, i.e., whether the signal within the frame or block is transient or static. The dynamic characteristics of the signal is determined on the basis of calculated values of temporal changes in the upper limit of the samples within the frame or sample values within the frame before the frame is orthogonally transformed. Alternatively, the calculated values of temporal changes in energy in the frame can be used. Hence, with the present apparatus, the block lengths of orthogonal transform in each frequency range or frequency band are changed in response to the dynamics of the input signal. The signal may be divided in frequency into critical bands.

The orthogonal transform could be a discrete cosine transform (DCT) which converts digital input signal by an orthogonal transform into spectral coefficients, or could be a fast Fourier transform (FFT).

In the allowable noise level setting circuit, it is preferred to divide the spectral coefficients into bands having a bandwidth that increases with frequency. The allowable noise level is based on the energies in the different frequency bands to take account of the masking effect. The term "masking effect" as used herein means both the masking effect on the time axis and the masking effect on the frequency axis.

In the block floating coefficient calculating circuit, a scale factor based on the maximum level of the spectral data points in a band of plural spectral data points from the frequency analyzing circuit may be used as the block floating coefficient. Alternatively, the maximum level data itself may be used as an approximate value of the block floating coefficient.

In the quantizing bit number decision circuit, the number of bits allocated for quantizing is determined in response to the block floating coefficient and the allowable noise level for each critical band, which takes account of masking. In this case, the number of spectral data points in one band in the block floating coefficient calculating circuit is matched or made equal to the number of spectral data points in the allowable noise level setting circuit.

A fourth aspect of the invention provides an apparatus for compressing a digital input signal. The apparatus comprises a frequency analyzing circuit that frequency analyzes the digital input signal to derive amplitude information and phase information. The apparatus also includes a quantizing circuit that quantizes the amplitude information and the phase information. The quantizing circuit allocates fewer bits to the phase information than to the amplitude information in a predetermined output frequency range of the frequency analyzing circuit.

According to the present invention, since ill effects are not perceived by the human auditory sense when fewer bits are allocated for quantizing phase information than for quantizing amplitude information, the signal compression factor may be increased by reducing the number of bits allocated for quantizing phase information.

According to the present invention, the frequency range in which fewer bits are allocated for quantizing phase is the higher frequency range. Consequently, deterioration in sound quality is minimized.

According to the present invention, if the number of bits allocated for quantizing phase information fewer than the number of bits allocated for quantizing amplitude information is preset, it is sufficient to transmit one of the amplitude quantizing bit number information and the phase quantizing bit number information simultaneously with the quantized data of the phase information and the amplitude information. This further reduces the number of bits required to transmit the quantizing bit number information.

According to the present invention, since the quantizing bit allocation for each frequency band is set using the allowable noise level based on the masking level found from the energies of the amplitude information for each band, data compression with less sound quality deterioration may be achieved.

A fifth aspect of the invention provides a combination of a compressor for compressing a digital signal to provide a compressed signal, and an expander for complementarily expanding the compressed signal to provide a digital output signal. The compressor comprises a circuit that divides the digital input signal into plural frequency ranges to provide plural frequency range signals. Each frequency range signal is arranged into frames composed of plural samples. A block length decision circuit determines a division of each frame of each frequency range signal into at least one block in response to a dynamic characteristic of each respective frequency range signal. An orthogonal transform circuit orthogonally transforms each frequency range signal to produce spectral coefficients. The orthogonal transform circuit transforms each frequency range signal in blocks determined by the block length decision circuit. A circuit quantizes the spectral coefficients using an adaptive bit allocation. Finally, a circuit includes the quantized spectral coefficients and subsidiary information indicating the adaptive bit allocation in the compressed signal.

The expander comprises a circuit that extracts the quantized spectral coefficients and the subsidiary information from the compressed signal. A circuit dequantizes the quantized spectral coefficients in response to the subsidiary information indicating the adaptive bit allocation to provide plural spectral coefficients. A circuit that includes a reverse orthogonal transform circuit transforms the spectral coefficients into frequency range signals. Finally, a circuit that includes an inverse band division filter synthesizes the frequency range signals to produce the digital output signal.

A sixth aspect of the invention provides a method for storing on a medium a compressed digital signal derived from a digital input signal divided into frames of plural samples. According to the method, plural orthogonal transforms of the digital input signal are performed. Each orthogonal transform orthogonally transforms a block of the digital input signal derived by dividing a frame of the digital input signal by a different divisor to provide spectral coefficients. Each orthogonal transform also quantizes the spectral coefficients using an adaptive bit allocation, and provides the quantized spectral coefficients as the output signal for the orthogonal transform. The output signal for one of the orthogonal transforms is selected as the part of the compressed signal in response to a selection signal for each orthogonal transform. Subsidiary information indicating the adaptive bit allocation is also included in the compressed signal. Finally, the compressed signal is stored in the medium.

A seventh aspect of the invention provides a method for storing in a medium a compressed digital signal derived from a digital input signal. According to the method, the digital input signal is divided into plural frequency ranges to provide plural frequency range signals. Each frequency range signal is arranged into frames of plural samples. A division of each frame of each frequency range signal into blocks is determined in response to a dynamic characteristic of each respective frequency range signal. Each frequency range signal is orthogonally transformed in blocks determined by the determining step to produce spectral coefficients. The spectral coefficients are quantized using an adaptive bit allocation. The quantized spectral coefficients and subsidiary information indicating the adaptive bit allocation are included in the compressed digital signal. Finally, the compressed digital signal is stored in the medium.

An eighth aspect of the invention provides a method for storing in a medium a compressed digital signal derived from a digital input signal. According to the method, the digital input signal is frequency analyzed to provide plural spectral data points. The spectral data points are formed into plural bands. An energy is determined for each band. An allowable noise level is set in response to the energy in each band. A block floating coefficient is calculated for each band in response to a maximum level spectral data point in the band. A number of quantizing bits for each band is determined in response to the allowable noise level and the block floating coefficient for the band. The spectral data points in each band are quantized using the number of quantizing bits determined in the step of determining the number quantizing bits. The quantized spectral data points and subsidiary information indicating the number of quantizing bits for each band are included in the compressed digital signal. Finally, the compressed digital signal is stored in the medium.

A final aspect of the invention provides a method for storing in a medium a compressed digital signal derived from a digital input signal. According to the method, the digital input signal is frequency analyzed to provide amplitude information and phase information. The amplitude information and the phase information is quantized by allocating fewer bits to the phase information than to the amplitude information in a predetermined frequency range of the frequency-analyzed digital input signal. The quantized amplitude information and phase information is included in the compressed digital signal. Finally, the compressed digital signal is stored in the medium for storing compressed digital data derived from digital input signal by a process in which the digital input signal is frequency analyzed and the frequency-analyzed digital input signal is converted into amplitude information and phase information. The amplitude information and the phase information are quantized by allocating fewer bits to the phase information than to the amplitude information in a predetermined frequency range of the frequency-analyzed digital input signal.

DETAILED DESCRIPTION OF THE INVENTION

Figure 1:
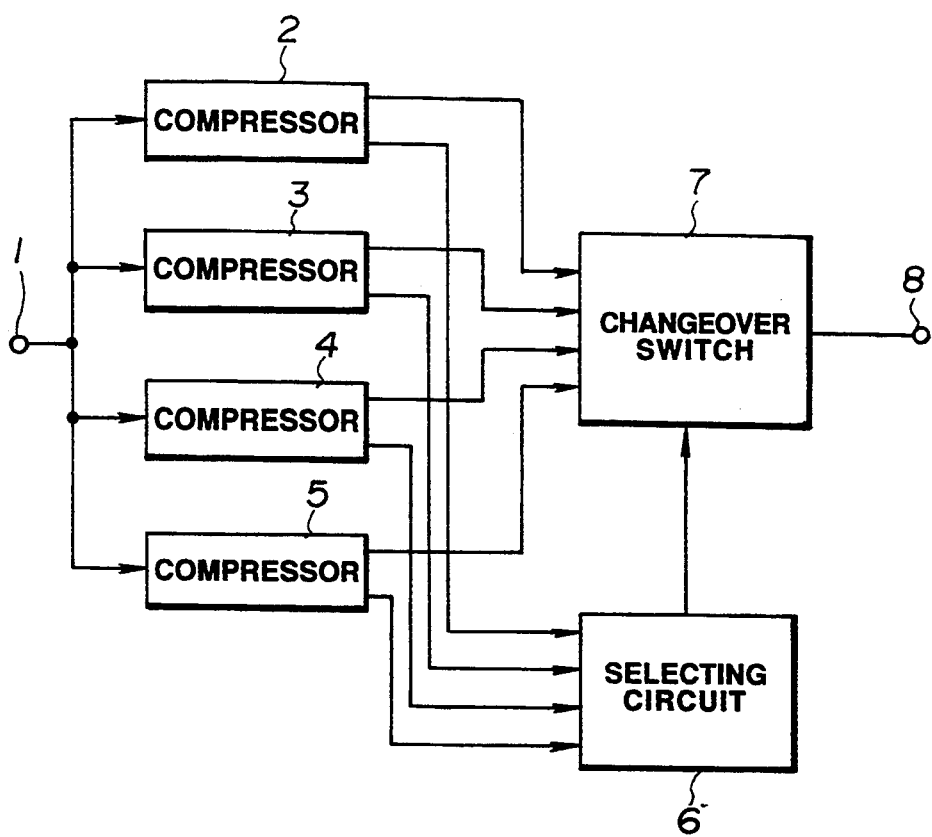
FIG. 1 is a block circuit diagram showing the schematic construction of an apparatus for compressing a digital input signal according to a first embodiment of the present invention.

Referring to the drawings, certain preferred embodiments of the present invention will be described in detail.

FIG. 1 shows an apparatus for compressing a digital input signal that divides a digital input signal, such as a digital audio signal, into plural frequency ranges having a bandwidth that increases with increasing frequency; forms blocks each consisting of plural samples, for each of the frequency ranges; effects an orthogonal transform by, e.g., a discrete cosine transform, for each block in each frequency range to produce spectral coefficients (e.g., DCT coefficients); and quantizes the spectral coefficients with an adaptively-allocated number of bits.

The present apparatus for compressing a digital input signal includes plural compressors, such as four compressors 2 to 5, each being provided with an orthogonal transform circuit that carries out an orthogonal transform of the digital input signal in each frequency range with block lengths which are different from one frequency range to another. Only one of the outputs from the compressors 2 to 5, that is, one of the outputs from the orthogonal transform circuits, is selected based on the outputs from the orthogonal transform circuits in the compressors 2 to 5. In other words, the block lengths of the DCT-processed blocks for each frequency range differ from one compressor to another, and only one of the outputs of the compressors 2 to 5 is selected by the selecting circuit 6. The selection is based on the outputs from the compressors 2 to 5. That is, the state of the changeover switch 7 is changed in response to a selecting signal from the selecting circuit 6 to select only one of the outputs of the compressors 2 to 5.

The selecting circuit 6 selects the output of the compressor requiring the least number of quantizing bits to quantize the input signal. That is, although the number of bits in the outputs of the compressors 2 to 5 for each frame is a certain predetermined number corresponding to the output bit rate, the number of bits actually required by each compressor to quantize a given frame is determined by an adaptive bit allocation process that takes masking effects into account, as will be later described, and which depends how each frame of the input signal is divided into blocks. The above-mentioned selection is so made that the output of the compressor requiring the least number of bits actually to quantize a given frame is selected.

Thus, if the actual number of bits required for quantizing is less than the number of bits determined by the output bit rate, the unused quantizing bits may be used for effecting a more optimum quantizing. On the other hand, if the number of quantizing bits required by the compressors 2 to 5 exceeds the number of bits determined by the output bit rate, the least degradation due to under quantizing may be obtained by selecting the output of the one of the compressors 2 to 5 requiring the least number of bits for quantizing.

Figure 2:
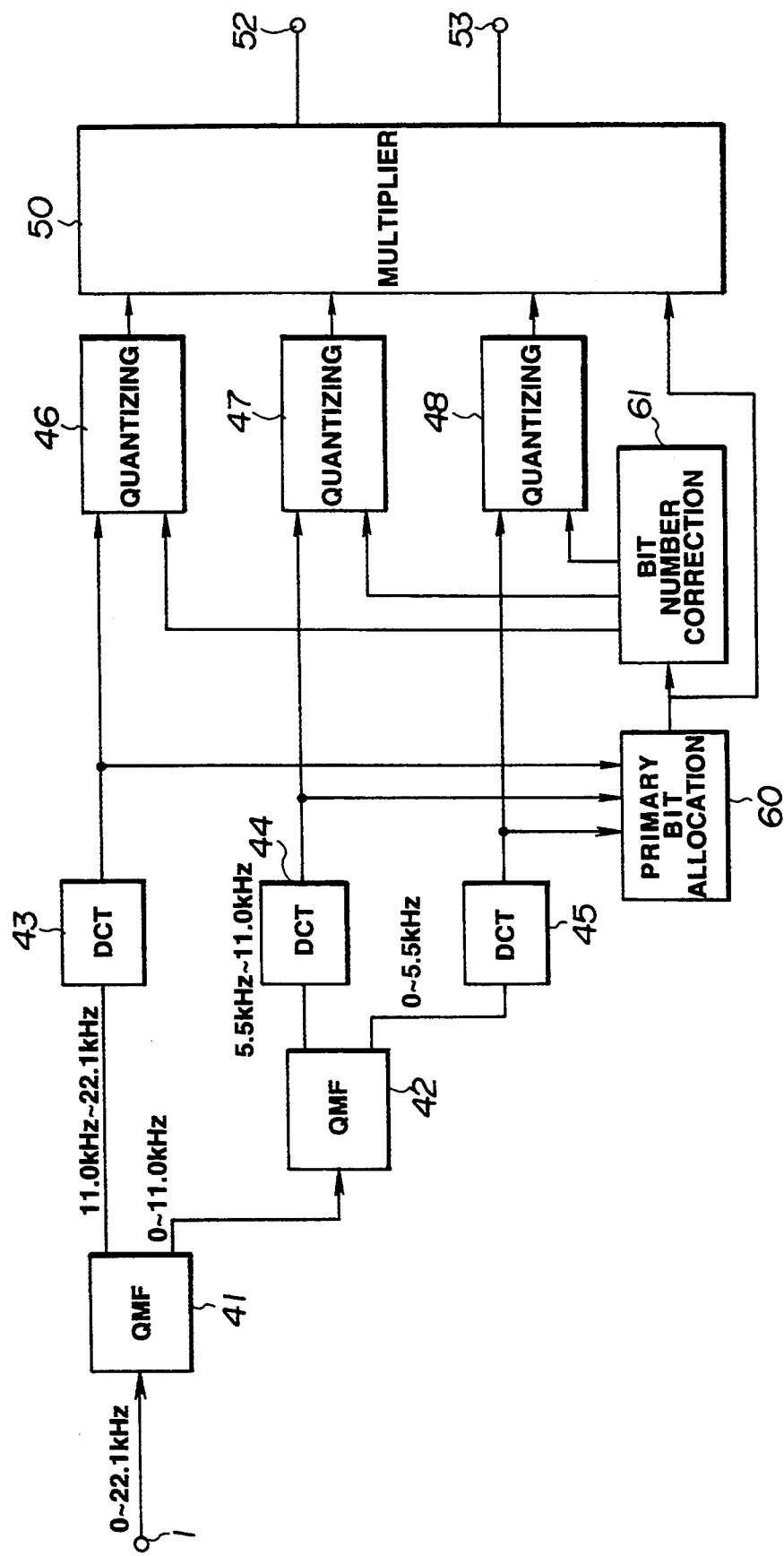
FIG. 2 is a block diagram showing the schematic construction of an illustrative compressor.

In each of the compressors 2 to 5 of the present apparatus for compressing a digital input signal, as shown in FIG. 2, a digital input signal, such as an audio or voice signal, supplied via an input terminal 1, is divided in frequency into three frequency ranges by quadrature mirror filters (QMF) 41 and 42. The bandwidth of the frequency ranges increases with increasing frequency in accordance with a frequency division according to critical bands. In the DCT circuits 43, 44 and 45, blocks each consisting of plural samples are formed for each frequency range and an orthogonal transform (a transform from the time axis to the frequency axis) is carried out on each block to produce spectral coefficients (e.g., DCT coefficients).

The DCT coefficients produced by the DCT circuits 43, 44, and 45, respectively, are grouped by frequency into, e.g., two high frequency bands, three mid frequency bands, and 20 low frequency bands to correspond to critical frequency bands. The DCT coefficients in the respective critical bands from the DCT circuits 43 to 45 are quantized using an adaptive number of quantizing bits allocated by the quantizing circuits 46, 47 and 48. That is, the DCT coefficients in the three frequency ranges are quantized by the quantizing circuits 46, 47, and 48 of the present embodiment using an adaptive quantizing word length; the number of bits allocated to quantize the DCT coefficients in each critical band according to division into frequency ranges, is based on certain characteristics of the human auditory sense.

For effecting the above-mentioned division into critical bands, a digital input signal in the frequency range of 0 Hz to 22.1 kHz, obtained by sampling an analog audio signal, etc. and divided into, frames of e.g., 1024 samples, is supplied to the input terminal 1 of each of the compressors 2 to (FIG. 1). In each compressor, the digital data is divided by the QMFs 41 and 42 into three frequency ranges (0 Hz to 5.5 kHz, 5.5 kHz to 11.0 kHz and 11.0 to 22.1 kHz), having a bandwidth that increases with increasing frequency. In the QMF 41, the digital input signal in the frequency range of 0 Hz to 2.1 kHz is divided into two frequency range signals to produce a frequency range signal of 11.0 kHz to 22.1 kHz and a frequency range signal of 0 Hz to 11.0 kHz. The outputs are supplied to the DCT circuit 43 and to the QMF 42, respectively. The 0 Hz to 11.0 kHz output supplied to the QMF 42 is further divided into two frequency range signals by the QMF 42 to produce a 5.5 kHz to 11.0 kHz output and a 0 Hz to 5.5 kHz output which are supplied to the DCT circuits 44 and 45, respectively.

In each of the DCT circuits 43, 44 and 45, plural, e.g., 1024, samples, of the frequency range signals constitute a frame B, and an orthogonal transform, e.g., a DCT, is carried out on each block formed by dividing the frame B. The result of the orthogonal transform is plural spectral coefficients, e.g., DCT coefficients. The block length processed by each of the DCT circuits 43, 44 and 45 has a different value in each of the compressors 2 to 5.

Figure 3:
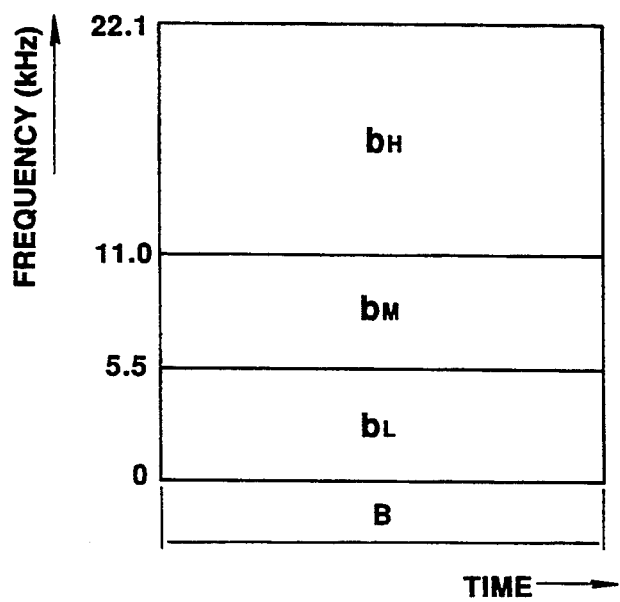
FIG. 3 is a diagrammatic view showing a DCT processing block in which the block length is the same for each frequency range.

For example, in the compressor 2, the block length is the same in each frequency range, as shown in FIG. 3. That is, in the compressor 2, the block length $b_H$ in the DCT circuit 43 for the high frequency range of 11.0 kHz to 22.1 kHz, the block length $b_M$ in the DCT circuit 44 for the middle frequency range of 5.5 kHz to 11.0 kHz and the block length $b_L$ in the DCT circuit 45 for the low frequency range of 0 Hz to 5.5 kHz, are selected to be equal to the length of the frame B having the above mentioned predetermined unit of time duration.

Figure 4:
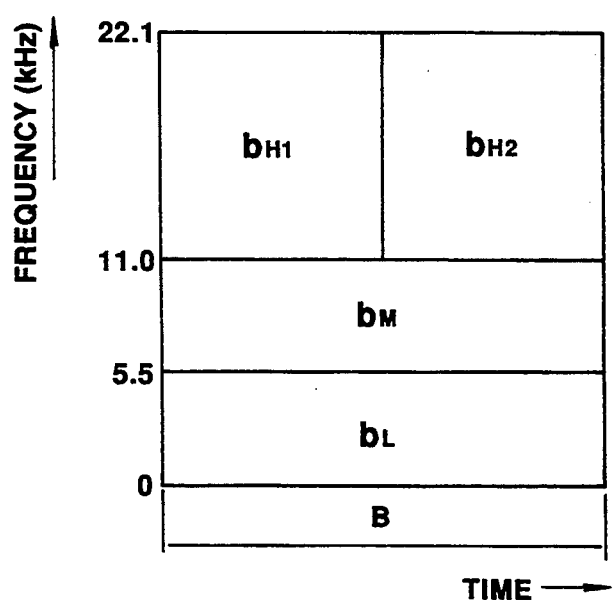
FIG. 4 is a diagrammatic view showing a DCT processing block in which the block length for the high frequency range is one-half the frame length.

In the compressor 3, the block length is selected to be shorter in the high frequency range, as shown in FIG. 4. That is, in the compressor 3, the block length in the high frequency range DCT circuit 43 is one-half the block length $b_L$ in the low frequency range DCT circuit 45 and the block length $b_M$ in the middle frequency range DCT circuit 44. In the present example, in the high frequency range the frame is divided into blocks $b_{H1}$, $b_{H2}$.

Figure 5:
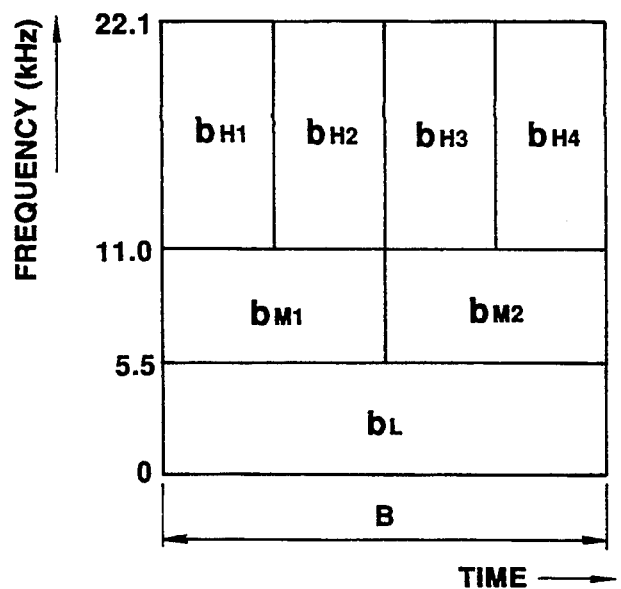
FIG. 5 is a diagrammatic view showing a DCT processing block in which the block length for the high frequency range is one-fourth the frame length and that for the mid frequency range is one-half the frame length.

In the compressor 4, the block length processed by the DCT circuits is selected to be shorter in the middle and high frequency ranges, as shown in FIG. 5. That is, with the block length $b_L$ of the low frequency range, the middle frequency range has block lengths $b_{M1}$, $b_{M2}$ equal to, e.g., one-half the low frequency range block length and the high frequency range has block lengths $b_{H1}$, $b_{H2}$, $b_{H3}$ and $b_{H3}$, equal to one-fourth the low frequency range block length or one-half the middle frequency range block length.

Figure 6:
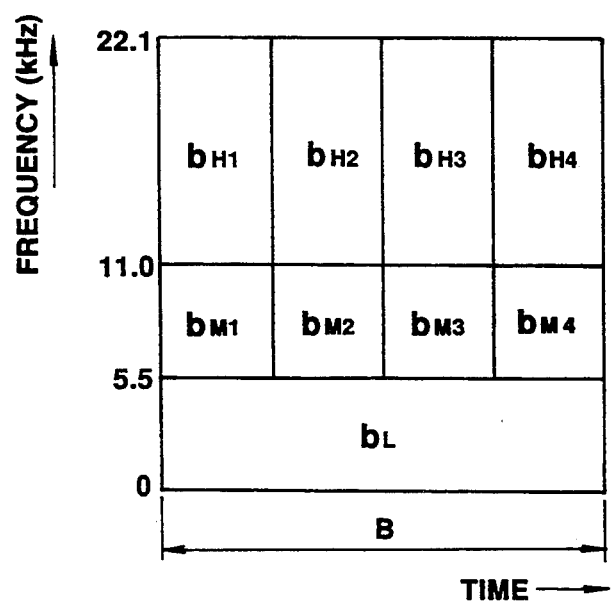
FIG. 6 is a diagrammatic view showing a DCT processing block in which the block length for the high frequency range is one-fourth the frame length and that for the mid frequency range is one-fourth the frame length.

In the compressor 5, the block length processed by the DCT circuits is selected to be shorter in the high and middle frequency ranges and longer in the low frequency range, as shown in FIG. 6. That is, with the block length $b_L$ of the low frequency range, the high frequency range has block lengths $b_{H1}$, $b_{H2}$, $b_{H3}$ and $b_{H4}$, equal to one-fourth the low frequency range block length, while the middle frequency range has the block length $b_{M1}$, $b_{M2}$, $b_{M3}$, $b_{M4}$ equal to, e.g., one-fourth the low frequency range block length.

The block lengths of the high and middle frequency ranges are selected to be shorter than the block length of the low frequency range, as discussed above in connection with FIGS. 4 to 6, for the following reason. The frequency resolution in the human auditory sense is considerably less in the high frequency range than in the low frequency range. Hence, it is necessary to maintain a high frequency resolution in the low frequency range. Thus, the block length for DCT processing cannot be reduced excessively in the low frequency range. For this reason, the block length is selected to be longer in the low frequency range. On the other hand, since changes in signal level take place more slowly with low frequency range signals than with high frequency range signals, it is advantageous to shorten the block length in the high and middle frequency ranges to decrease the frequency resolution and to increase the temporal resolution. In view of this, the block length of the high and middle frequency ranges is selected to be shorter, and that of the low frequency range is selected to be longer in the present embodiment.

Thus, in the present embodiment, for simultaneously satisfying the requirements for frequency and time resolution of the human auditory sense, the number of samples in each block subject to the orthogonal transform is increased for the low frequency range (0 Hz to 5.5 kHz) to raise the frequency resolution, while temporal resolution is raised for the high frequency range (11.0 to 2.1 kHz) and occasionally for the middle frequency range (5.5 to 11.0 kHz) by dividing the frame into shorter blocks.

In view also of the dynamic characteristics of the input audio signal, it is effective to shorten the block lengths processed by the DCT circuit for the high and middle frequency ranges.

The block lengths processed by the DCT circuits may be effectively changed depending on the dynamics of the input audio signal, i.e., depending on whether the signal is static or if it includes a transient. In the case of a static signal, it is effective to set the block lengths of the respective frequency ranges so as to be of equal length, as shown in FIG. 3, whereas, in the case of a transient signal, it is effective to reduce the block lengths of the high and middle frequency ranges, as shown in FIG. 6. By reducing the block length for a transient signal in this manner, more quantizing bits can be allocated to the blocks in frame B having a high peak level (transient signal part) during quantizing, while the number of bits allocated to the other blocks can be reduced. In this manner, quantizing bits can be allocated to blocks truly in need of the bits in each frequency range of frame B to enable the compressor to track temporal changes of the input signal spectrum. On the other hand, redundant quantizing when signals of similar spectra occur in each block of the frame B may be avoided in the case of static signals.

The possible block lengths processed by the DCT circuits in the respective frequency ranges are not limited to the examples shown in FIGS. 3 to 6. A greater variety of block length patterns may be envisaged, such as reducing the block length further in the high frequency range or simultaneously reducing the block length for the low frequency range.

In each of the compressors 2 to 5, DCT processing is carried out in each of the DCT circuits 3 to 45 in FIG. 2 using different block lengths in each frequency range to produce DCT coefficients which are transmitted to quantizing circuits 46 to 48.

Each of the compressors 2 to 5 quantizes the spectral coefficients by adaptive bit allocation in the quantizing circuits 46 to 48 having the following arrangement.

Each of the compressors 2 to 5 is provided with a primary bit allocation number decision circuit 60 for determining a primary number of quantizing bits, which is the number of quantizing bits actually required to quantize the DCT coefficients resulting from orthogonally transforming the frame B by the DCT circuits 43, 44 and 45. The primary number of quantizing bits is the number of bits required to provide a predetermined sound quality. Each compressor also includes a bit number correction circuit 61 for effecting bit distribution or bit reduction to adjust the primary number of bits determined by the circuit 60 so that the number of bits used equals the preset number of bits for the frame B corresponding to the bit rate, i.e., the number of bits available to quantize the frame B. Thus, each of the quantizing circuits 46 to 48 quantizes the DCT coefficients using the number of quantizing bits obtained by correcting the primary number of bits by the bit number correcting circuit 61 to conform with the above-mentioned preset number of bits.

The primary number of bits is determined in the primary bit allocation circuit 60, taking into account masking, which will now be explained.

Masking is a characteristic of the human auditory sense. That is, among the characteristics of the human auditory sense, there is what is termed the masking effect, which is divided into temporal masking effect and concurrent masking. Concurrent masking is an effect in which a small sound or noise is masked by a larger sound produced concurrently. The masked sound or noise becomes inaudible. Temporal masking is an effect in which a small sound or noise is masked by a larger sound occurring before the small noise (forward masking) or by a larger sound or noise occurring after the small sound (backward masking). Again, the masked sound or noise becomes inaudible. Because of the characteristics of the human auditory sense, the effect of forward masking lasts a relatively long time, for example, for about 100 msec, whereas the effect of backward masking lasts for a shorter time, of the order of 5 msec. The level of the masking signal must be of the order of 20 dB and 30 dB greater than the level of the masked signal to provide forward masking and backward masking, respectively.

Therefore, optimum quantizing bit allocation may be obtained by taking into account the masking effect at the time of bit allocation to the frame B. Since the number of bits for quantizing the masked portion of a signal may be reduced without any audible adverse effects, the total number of quantizing bits may be reduced without impairing the audible sound quality. The masking level may be found on the basis of the sum of energies for the respective critical bands. When finding the masking level, the amount of masking of signals in a given critical band by signals in other critical bands may also be found. The allowable noise level for each critical band is determined based on the masking level and the number of bits required to quantize the DCT coefficients in each critical band may be found based on the allowable noise level for each critical band.

The primary number of quantizing bits determined by the primary bit allocation circuit 60 is transmitted to the bit number correction circuit 61, which circuit 61 carries out bit distribution or bit reduction to match the primary number of bits determined by the circuit 60 to the above-mentioned preset number of bits for the frame B.

Figure 7:
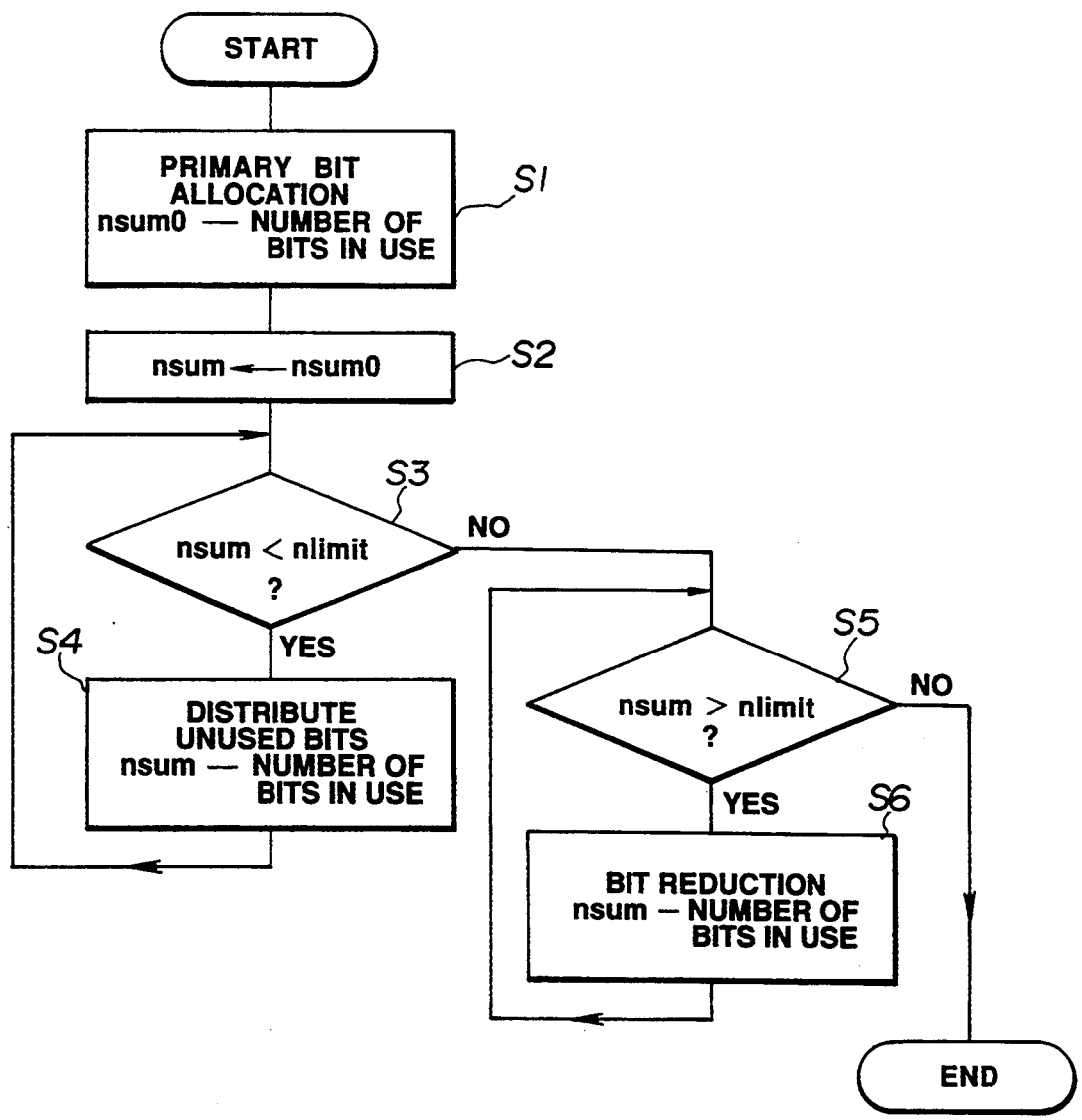
FIG. 7 is a flow chart for illustrating the determination of the primary bit allocation and correction of the number of bits.

The sequence of operations for determining the primary number of bits by the circuit 60 and for bit distribution or reduction by the circuit 61 is shown in a flow chart in FIG. 7.

Referring to this flow chart, at step S1, the primary number of bits determined by the primary bit allocation circuit 60, that is, the primary number of quantizing bits actually required for quantizing in the quantizing circuits 46, 47 and 48, found on the basis of a calculation of the masking level, is substituted into a variable nsum0. At step S2, this variable nsum0 is sent to the bit number correction circuit 61, which substitutes the variable nsum0 into a variable nsum.

At step S3, it is checked whether the variable nsum is less than the number nlimit indicating the preset number of bits for the frame B. If the variable nsum is less than the value nlimit, program proceeds to step S4, otherwise, the program proceeds to step S5.

If the variable nsum is less than the value nlimit indicating the preset number of bits, this indicates that too few quantizing bits have been used. Thus, at step S4, the number of unused bits (the number of bits corresponding to the difference between the variable nsum and the value nlimit) is further distributed in the frame B. The unused bits are distributed among the critical bands for further improving the sound quality. The number of bits after the bit distribution is returned to step S3.

At step S5, it is checked whether the variable nsum is larger than the value nlimit indicating the preset number of bits. If the variable nsum is not larger than the value nlimit, the variable nsum is equal to the value nlimit in view of step S3, and processing is terminated. If the variable nsum is larger than the value nlimit, the program proceeds to step S6.

If the variable nsum is larger than the value nlimit, this indicates that too many quantizing bits have been used. Consequently, at step S6, the number of excess bits used is subtracted from the actual number of bits used, the number of bits corresponding to the variable nsum. Bit reduction is made by removing bits from critical bands that do not affect the sound quality. The number of bits after bit reduction is returned to step S5.

By the sequence of operations shown in the flow chart of FIG. 7, the number of quantizing bits is corrected, and quantizing in the quantizing circuits 46 to 48 is carried out on the basis of the thus-corrected number of bits.

Returning now to FIG. 2, quantized DCT coefficients from the quantizing circuits 46 to 48 are transmitted to the multiplexing circuit 50. Information indicating the primary bit allocation number determined by the primary bit allocation circuit 60 (information indicating the number of bits necessary to realize a predetermined sound quality) is also transmitted to the multiplexing circuit 50. DCT coefficients, quantized in the respective critical bands, are combined in the multiplexing circuit 50 and, among the thus-combined data, the quantized DCT coefficients are provided at the output terminal 52, while the information indicating the primary bit allocation number is provided at the output terminal 53.

The outputs from output terminals 52 and 53 in FIG. 2 are provided from the compressors 2 to 5 shown in FIG. 1. The quantized DCT coefficients from the compressors 2 to 5 are sent to the changeover switch 7, while the information indicating the primary bit allocation number is sent to the selecting circuit 6.

The selecting circuit 6 selects the output of the one of the compressors 2 to 5 having the smallest primary bit allocation number, that is, the smallest number of quantizing bits necessary to realize a predetermined sound quality. The selection is made in response to the information indicating the respective primary bit allocation numbers sent from the compressors 2 to 5, as mentioned above. The selected compressor output is transmitted to the changeover switch 7. The changeover switch 7 carries out a changeover operation and provides as its output only one of the quantized outputs supplied thereto from the compressors 2 to 5, in response to the above mentioned selection signal. In this manner, only the thus-selected quantized output is provided from the output terminal 8.

When the quantized output is expanded by a complementary expander, not shown, in response to the above-mentioned information indicating the primary bit allocation number, the resulting sound is of an optimum sound quality.

As described above, with the apparatus for compressing a digital input signal, only the optimally-quantized compressor output is selected from the outputs of the compressors 2 to 5 to provide the compressed output signal. The compressed output signal may be expanded and converted into sound for producing the optimum sound quality. Also, since the optimally-quantized output is selected, the block selected for DCT processing has an optimum block length, while the selection of the block length is also facilitated. The apparatus of the present embodiment may be adapted to an apparatus for preparing a signal to be recorded in a package medium, such as a compact disc (CD). Since only a expander (player) needs to be owned by the consumer in this case, the compressor may be of any desired size.

In the above-described embodiment, the DCT circuits 43 to 45 processing blocks with different block lengths are included in each of the compressors 2 to 5. Alternatively, only one compressor may be provided, and a DCT circuit for effecting DCT processing having the capability of performing DCT processing operations using different block lengths may be provided for each frequency range. In this case, the output of the one DCT circuit using the least number of quantizing bits is selected from among the plural DCT circuits for each of the frequency ranges.

In such an alternative apparatus for compressing a digital input signal, only one compressor is provided in place of the plural compressors shown in FIG. 1. Comparing the construction of the alternative compressor to the construction shown in FIG. 2, the set of three DCT circuits 43 to 45 is not associated with one combination of block lengths for each frequency range as in FIG. 2. Instead, plural DCT circuits corresponding to the number of block lengths possible in the respective frequency ranges, as shown in FIGS. 3 to 6, are provided. For example, three DCT circuits having different block lengths are provided for the high frequency range, while three DCT circuits having three different block lengths are provided for the middle frequency range and a sole DCT circuit is provided for the low frequency range. In other words, three DCT circuits are provided for the high frequency range for DCT processing the high frequency range signal with three different block lengths corresponding to the block lengths $b_H$ of FIG. 3, the block lengths $b_{H1}$ and $b_{H2}$ of FIG. 4 and the block lengths $b_{H1}$, $b_{H2}$, $b_{H3}$ and $b_{H4}$ of FIGS. 5 and 6. In similar manner, three DCT circuits are provided for the middle frequency range for DCT processing the middle frequency range signal with three different block lengths corresponding to the block length $b_M$ of FIGS. 3 and 4, the block lengths $b_{M1}$ and $b_{M2}$ of FIG. 6 and the block lengths $b_{M1}$, $b_{M2}$, $b_{M3}$ and $b_{M4}$ of FIG. 6. Finally, a DCT circuit is provided for the low frequency range for DCT processing the low frequency range signal with a single block length corresponding to the block length $b_L$ shown in FIGS. 3 to 6. By transmitting the outputs of the DCT circuits to the selecting circuit 6, and by selecting only one of the DCT circuit outputs for each frequency range, processing similar to that achieved with the arrangement of FIG. 1 may be achieved. In this manner, results similar to those achieved in the arrangement of FIG. 1 may be achieved, while the construction is also simplified.

Figure 8:
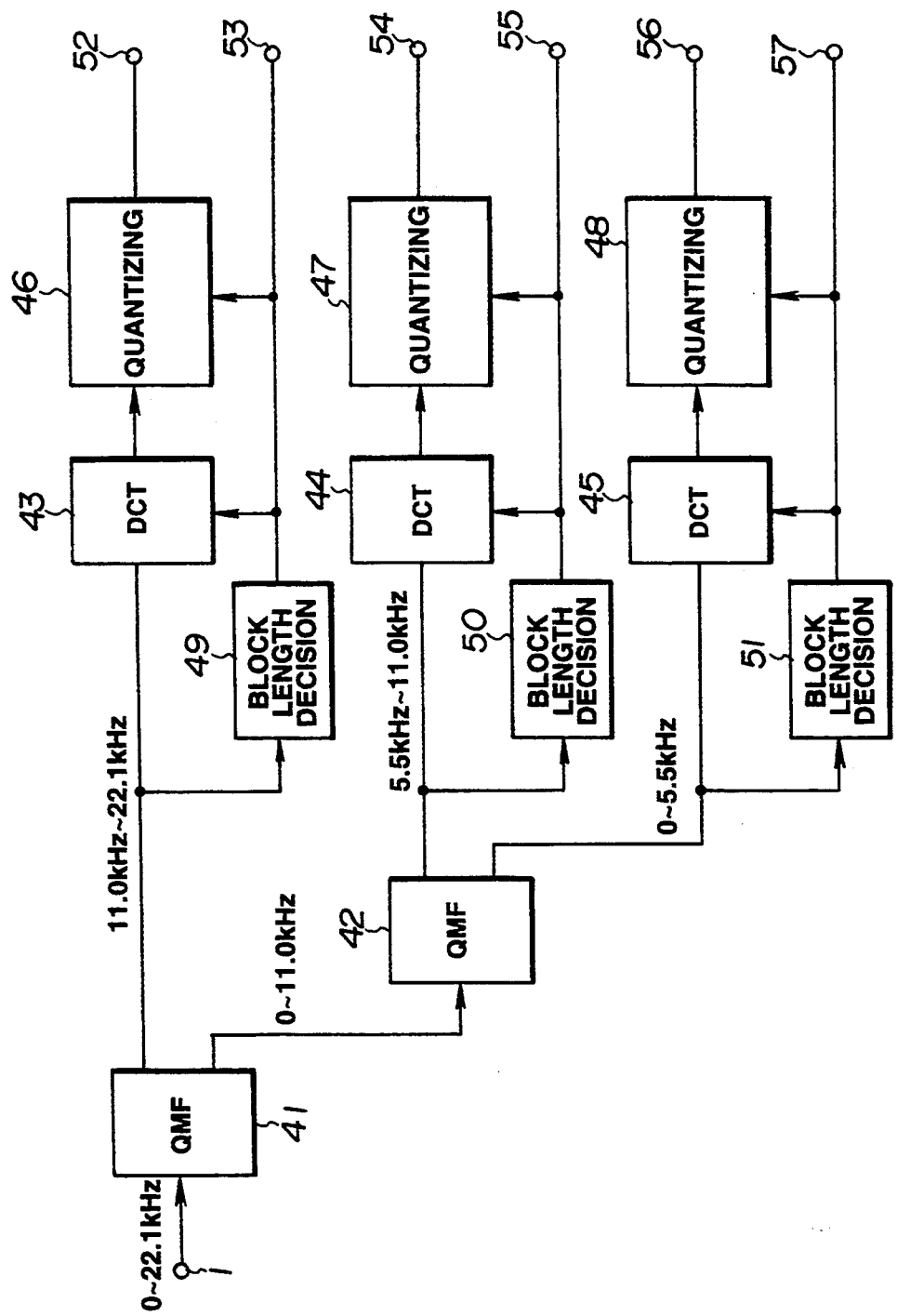
FIG. 8 is a block circuit diagram for illustrating the schematic construction of an apparatus for compressing a digital input signal according to a second embodiment of the present invention.

An apparatus for compressing a digital input signal according to a second embodiment is shown in FIG. 8. The apparatus includes block length decision circuits 49, 50 and 51 for determining block lengths of the orthogonal transform for each frequency range. The determination is based on the dynamic characteristics (e.g. transient or static) of each frame of the signal before the orthogonal transform of each frequency range signal is carried out. Orthogonal transform operations are then carried out by the circuits 43 to 45 using the block lengths determined for the respective frequency ranges by the circuits 49 to 51. Additionally, an arrangement for changing the block size is included in the DCT circuits 43 to 45.

Referring to FIG. 8, the outputs of the QMF filters 41 and 42 are additionally connected to the block length decision circuits 49 to 51. These circuits determine whether the frame B (FIGS. 9A and 9B) of the digital input signal represents a transient signal or a static signal, and provide a block length decision signal that depends on the determination. The block length decision signal changes the DCT processing block length in the DCT circuits 43 to 45.

Figure 9A:
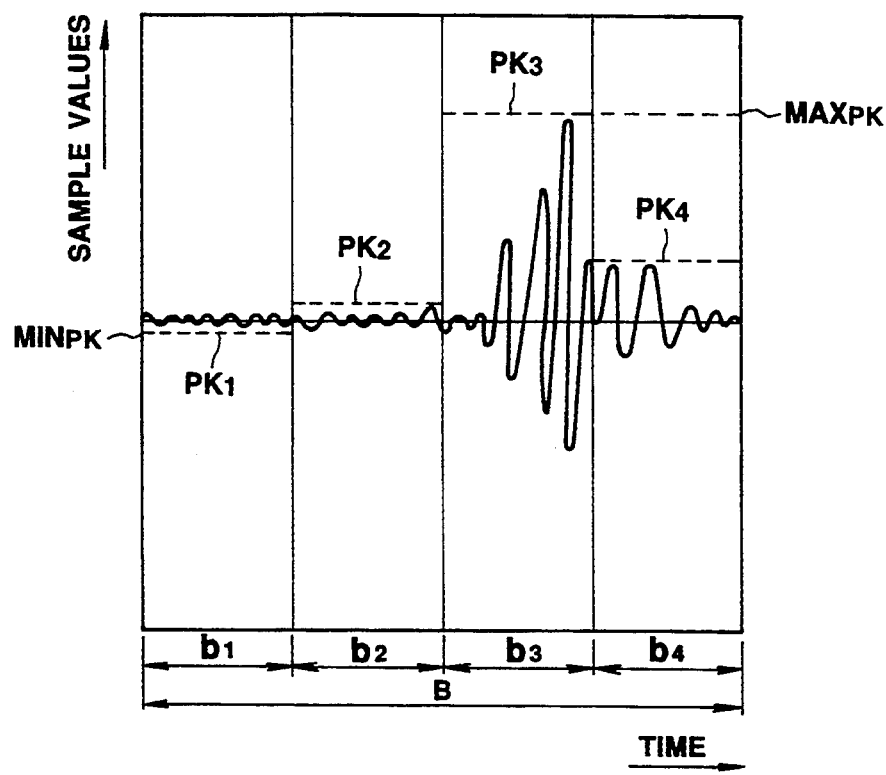
FIG. 9A is a graph showing typical transient signals.
Figure 9B:
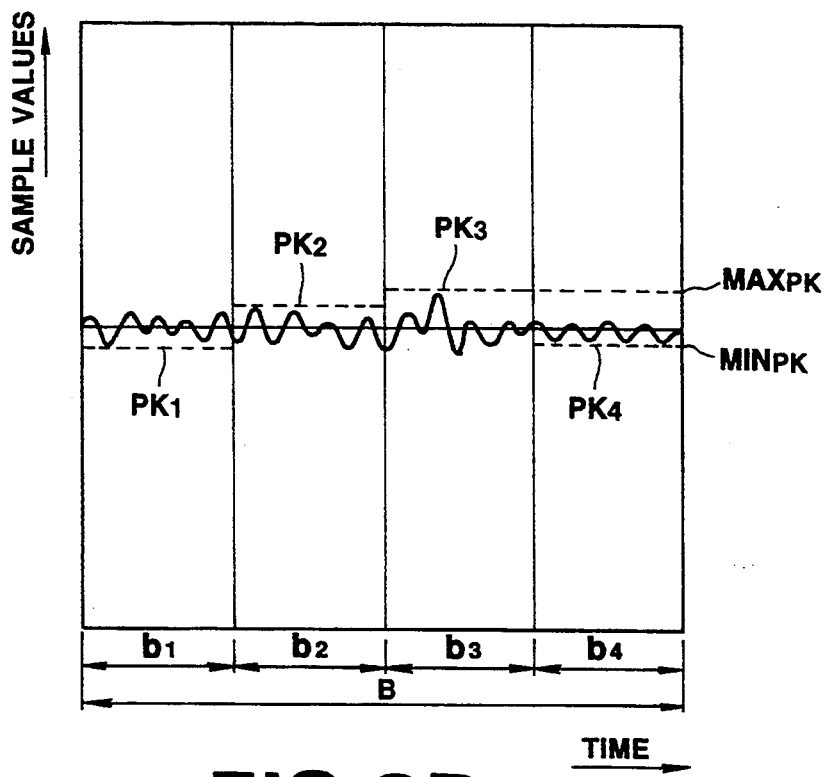
FIG. 9B is a graph showing typical static signals.

In the block length decision circuits 49 to 51, associated with each frequency range, the peak level is found for each of the sub-blocks $b_1$, $b_2$, $b_3$ and $b_4$, obtained by dividing the length of the frame B into four parts, and the temporal changes in the peak level are found for the sub-blocks $b_1$, $b_2$, $b_3$ and $b_4$. For example, the maximum peak level $Max_{pk}$ and the minimum peak level $Min_{pk}$ are found from the peak levels $PK_1$, $PK_2$, $PK_3$ and $PK_4$ of the sub-blocks $b_1$, $b_2$, $b_3$ and $b_4$, respectively. The ratio $Max_{pk}/Min_{pk}$ is compared to a reference value within a reference range. If the ratio is larger than the reference value, the signal within the frame B is determined to be a transient signal, whereas, if the ratio is less than the reference value, the signal within the frame B is determined to be a static signal. If the ratio is within the reference range, the signal is determined to be intermediate between a transient signal and a static signal. FIGS. 9A and 9B show examples of a transient signal and a static signal, respectively.

The block-length decision circuits 49 to 51 may also be designed to determine the block length based on the signal energies in the sub-blocks $b_1$, $b_2$, $b_3$ and $b_4$. In this case, the energies in the respective sub-blocks are found, the ratio between the maximum and minimum energies is found and the ratio is compared to the reference range of signal energies to make the determination described above.

The above-mentioned determination is carried out in the block length decision circuits 49 to 51 in which the block lengths corresponding to the detected results are determined. The DCT processing in the DCT processing circuits 43 to 45 is carried out using the block lengths determined by the block length decision circuits 49 to 51.

If the signal in a frame is determined to be a static signal by the respective one of block length decision circuits 49 to 51, the block length in each frequency range is set to be the same, such as the length of the frame B. Thus the block lengths $b_H$, $b_M$ and $b_L$ for the high frequency range of 11.0 to 22.1 kHz, middle frequency range of 5.5 to 11.0 kHz and for the low frequency range of 0 Hz to 5.5 kHz, respectively, are made equal to the frame length.

Conversely, if the signal is determined to be a transient signal, the block lengths are made shorter for the high and middle frequency ranges and longer for the low frequency range, as shown in FIG. 6. That is, for the block length $b_L$ for the low frequency range is made equal to the length of corresponding to the frame B, the block length for the high and middle frequency ranges are set to be one-fourth the block length $b_L$. In the example of FIG. 6, the high frequency range blocks have block lengths $b_{H1}$, $b_{H2}$, $b_{H3}$ and $b_{H4}$, whereas the middle frequency range blocks have block lengths $b_{M1}$, $b_{M2}$, $b_{M3}$ and $b_{M4}$.

If the signal is intermediate between stationary and transient, the block lengths are such that, relative to the block length $b_L$ for the low frequency range, the block length for the middle frequency range is made equal to $b_L$, the block length for the low range, or equal to $b_{M1}$ or $b_{M2}$, equal to one-half that for the low frequency range. The block length for the high frequency range is made equal to $b_{H1}$ and $b_{H2}$ or equal to one-fourth, respectively, of $b_{H1}$, $b_{H2}$, $b_{H3}$ us and $b_{H4}$ which are one-half of the length for the low frequency range.

Although the low frequency range block length $b_L$ is constant in the embodiments of FIGS. 3 to 6, the low frequency range block length may also be varied in conformity to the signal. The block lengths for the higher frequency ranges may additionally be subdivided beyond one-half or one-fourth the length of the frame B.

The plural samples of the respective frequency ranges in the frame B are DCT processed by the DCT circuits 43 to 45 in block lengths set by the block length decision signals from the circuit 49 to 51. Thus, DCT processing for each frequency range is performed with the block lengths determined by the dynamics of the signal within the frame B.

Figure 10:
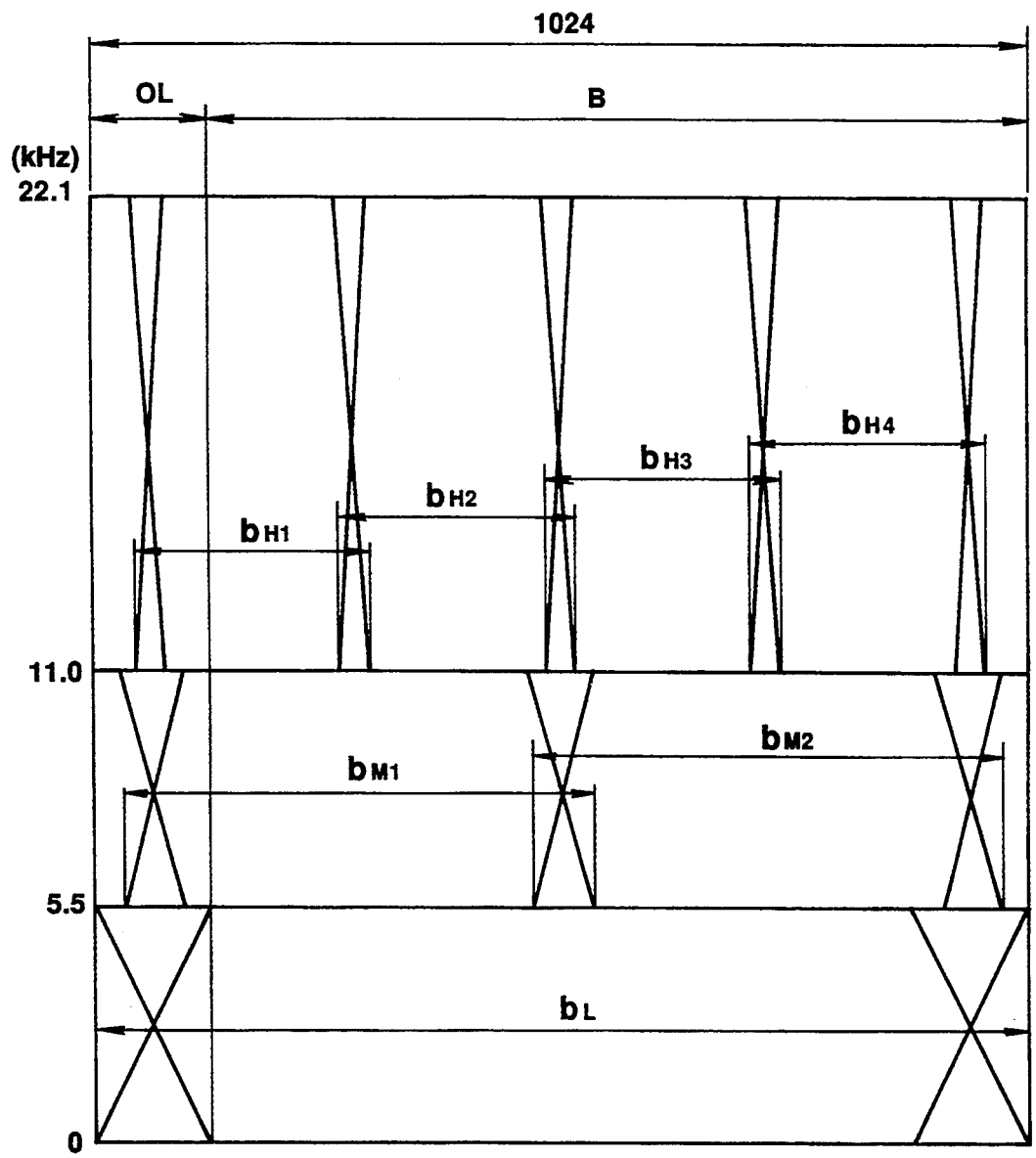
FIG. 10 is diagrammatic view showing a typical block in DCT processing.

The frame length used in the DCT processing carried out by the DCT circuits 43 to 45 is selected to be equal to 1024 samples, less an overlap OL, as shown in FIG. 10. FIG. 10 shows a signal intermediate between a transient signal and static in which the block lengths are those shown in FIG. 5. The orthogonal transform may also be another form of orthogonal transform other than a DCT, for example, a discrete fourier transform (DFT).

Outputs from the block length decision circuits 49 to 51 are also transmitted to the quantizing circuits 46 to 48 that quantize the DCT coefficients from the DCT circuits 43 to 45.

If the signal in the frame B is determined to represent a transient signal, and the block length processed by the DCT circuits 43 to 45 is shortened, the quantizing circuits 46 to 48 quantize the DCT coefficients using adaptive bit allocation within the frame B. In the example of FIG. 9A, more bits are allocated to quantize the block $b_3$ having the greatest peak level of the blocks $b_1$, $b_2$, $b_3$ and $b_4$, while the number of bits quantizing the remaining blocks $b_1$, $b_2$, and $b_4$ is reduced. This way more bits can be allocated to the block truly in need of bits, herein the block $b_3$, to enable the compressor to track temporal spectral changes. Bit allocation in this case may be carried out taking masking into account.

If the signal in the frame B is determined to be a static signal, and the block lengths processed by the DCT circuits 43 to 45 are lengthened, and quantizing in the quantizing circuits 46 to 48 is performed with the length of the frame B as the block length. In the example of FIG. 9B, quantizing is performed on the whole frame instead of dividing the frame into the four blocks $b_1$, $b_2$, $b_3$ and $b_4$ This eliminates the repetitive quantizing of signals having a substantially similar spectrum within the frame B.

In the case of a static signal, the long block lengths improve the accuracy of the spectral analysis in the DCT circuits 43 to 45. Masking calculations, if made, are also improved in accuracy, so that the number of quantizing bits used in the quantizing circuits 46 to 48 may be reduced.

Outputs from the quantizing circuits 46 to 48 are supplied from the output terminals 52, 54 and 56. Outputs from the block length decision circuits 49 to 51 are also supplied from the output terminals 53, 55 and 57 as sub-data. If the signal is static, the number of bits for the sub-data may be less the number of bits required for a transient signal. In the case of a transient signal, the sub-data for each of the four blocks must be provided at the output terminals 53, 55 and 57. In the case of a static signal, since the sub-data relates to the whole of the frame B, the number of bits of sub-data may be reduced.

With the above-described apparatus for compressing a digital input signal, since the block lengths used for the orthogonal transform of the respective frequency range signals are determined by the block length decision circuits 49 to 51, based on characteristics, such as whether a transient or static signal is represented, of the respective frequency range signals prior to the orthogonal transform, and the DCT processing for the respective frequency range signals is carried out by the DCT circuits 43 to 45 using a block length determined for each frequency range, quantizing may be made in conformity to signal dynamics, such as whether the signal is transient or static.

Figure 11:
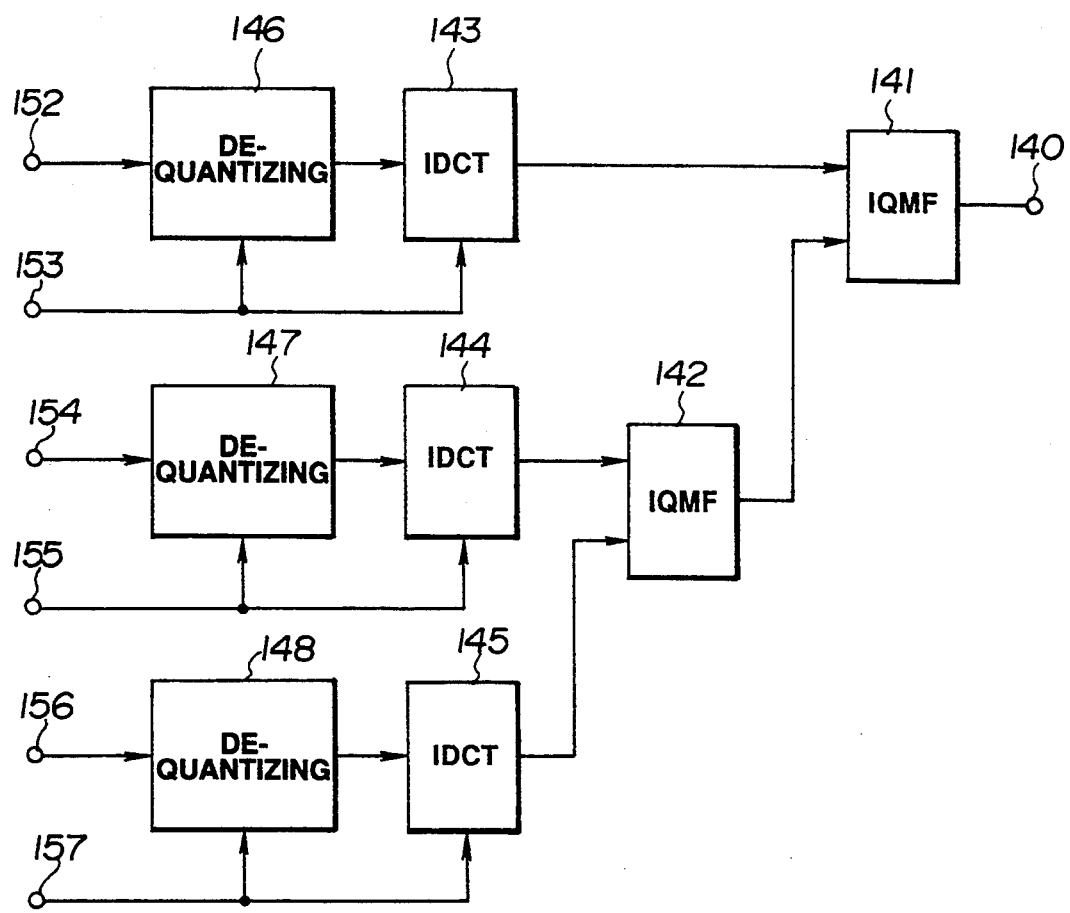
FIG. 11 is a block diagram showing the schematic construction of an expander apparatus as a counterpart, of the compressor apparatus.

FIG. 11 shows, in a schematic block diagram, an expander apparatus which is a counterpart of the compressor apparatus of the present embodiment. Referring to FIG. 11, quantized DCT coefficients from the output terminals 52, 54 and 56 of the compressor apparatus are supplied to the input terminals 152, 154 and 156, while sub-data from the output terminals 53, 55 and 57 of the compressor apparatus are supplied to the input terminals 153, 155 and 157. The quantized DCT coefficients and the sub-data are supplied to dequantizing circuits 146, 147 and 148, that dequantize the quantized DCT coefficients using the sub-data.

The dequantized DCT coefficients are supplied to the inverse discrete cosine transform (IDCT) circuits 143, 144 and 145, that perform an operation which is the inverse of the processing by the DCT circuits 43 to 45. The above sub-data is also supplied to the IDCT circuits 143 to 145 so that the processing by the IDCT circuits is performed on the basis of this sub-data. The output of the IDCT circuit 143 is supplied to an inverse quadrature mirror filter (IQMF) circuit 141, that performs a filtering operation which is the reverse of the operation performed by QMF 41. Outputs from the IDCT circuits 14 and 15 are supplied to the IQMF circuit 142 that performs a filtering operation which is the reverse of the operation performed by QMF 42. Since the output from the IQMF circuit 142 is supplied to the IQMF circuit 141, the digital audio output signal is obtained from IQMF circuit 141 is a combination of the signals divided into the respective frequency ranges. This audio output signal is provided at the output terminal 140.

Details of the quantizing bit allocation circuit will now be explained with reference to FIG. 12.

Figure 12:
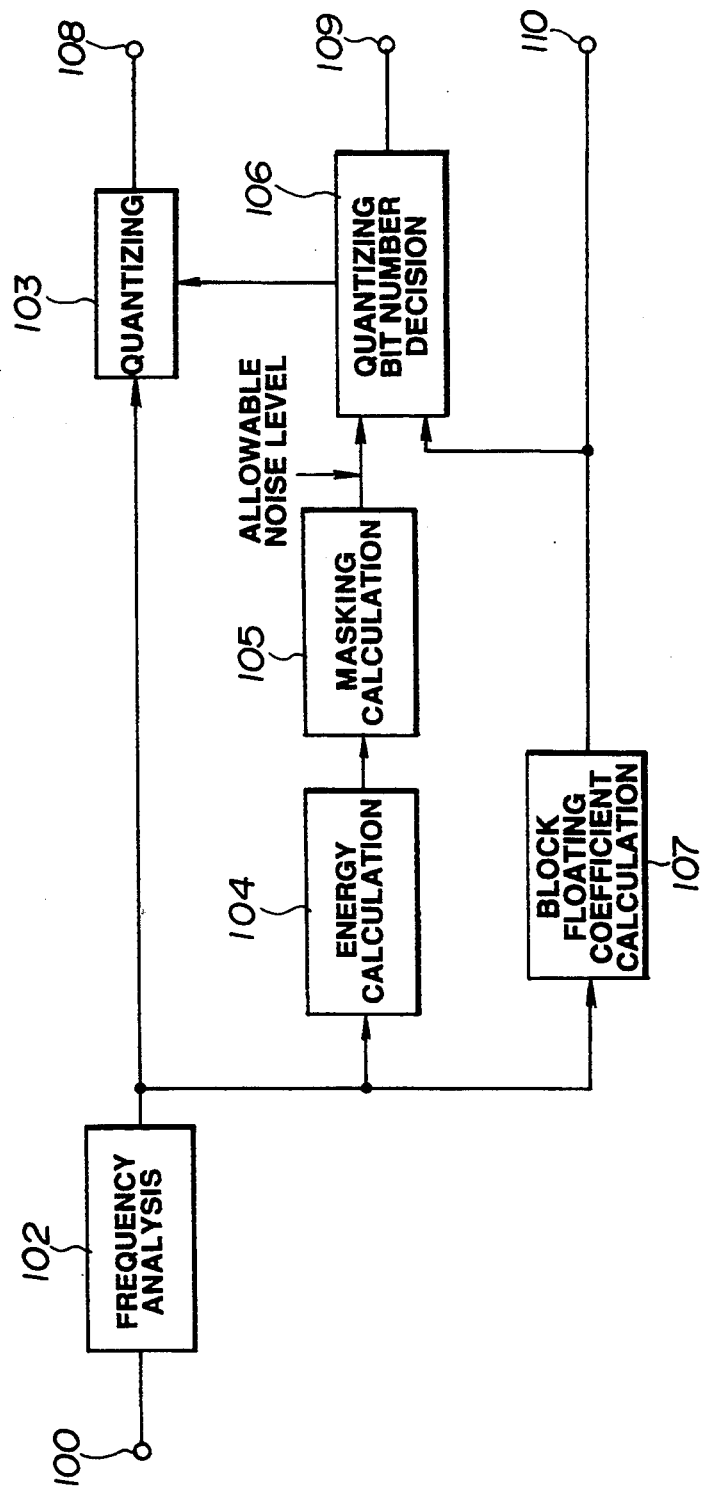
FIG. 12 is a block circuit diagram showing an apparatus for compressing a digital input signal according to a third embodiment of the present invention.

The circuit shown in FIG. 12 includes the frequency analyzing circuit 102 for frequency analyzing the digital input signal to provide plural spectral data points divided into plural frequency bands. The energy calculating circuit 104 and the masking calculating circuit 105 together constitute an allowable noise level setting circuit that sets the allowable noise level in each frequency band based on the energy of spectral data points from the frequency analyzing circuit 102 in each frequency band. A block floating calculating circuit 107 calculates block floating coefficients based on the maximum level of the spectral data points from the frequency analyzing circuit 102 in each of the plural frequency bands. A quantizing circuit 103 quantizes the output of the frequency analyzing circuit 102. Finally, the quantizing bit number decision circuit 106 determines the number of quantizing bits to be used by the quantizing circuit 103 in response to the output of the noise level setting circuit and the output of the block floating coefficient calculating circuit 107.

The frequency analyzing circuit 102 may be an independent circuit or may use the DCT circuits of FIG. 2. If the frequency analyzing circuit employs an orthogonal transform circuit, the spectral data points are the spectral coefficients, e.g., DCT coefficients, produced by the transform circuit. The quantizing circuit 103 is the counterpart of the quantizing circuits 46 to 48 of FIG. 2.

In the compressor apparatus shown in FIG. 12, a digital input signal, such a digital audio signal, is supplied to the frequency analyzing circuit 102 via the input terminal 100. In the frequency analyzing circuit 102, frequency analysis is performed by converting plural samples of the digital input signal into spectral data points, e.g., DCT coefficients, by an orthogonal transform such as a DCT.

The spectral data points from the frequency analyzing circuit 102 are supplied to the quantizing circuit 103, where they are quantized using adaptive bit allocation, before being provided to the output terminal 108.

The following arrangement is used for carrying out quantizing using an adaptively-allocated number of quantizing bits in the quantizing circuit 103.

The spectral data points from the frequency analyzing circuit 102 are transmitted to the energy calculating circuit 104, which forms part of the allowable noise level setting circuit, and to the block floating calculating circuit 107.

The energy calculating circuit 104 forms frequency bands, each formed of plural spectral data points from the frequency analyzing circuit 102. Preferably the audio frequency range is divided into, e.g., 25 frequency bands having bandwidths that increase with increasing frequency. Such frequency bands correspond to critical bands which take certain characteristics of the human auditory sense into account. The energy in each critical band, that is the energy sum of the spectral data points in each critical band, is found.

Details of the energy calculating circuit 104 and the circuits following it will be described next by referring to FIG. 12.

Figure 14:
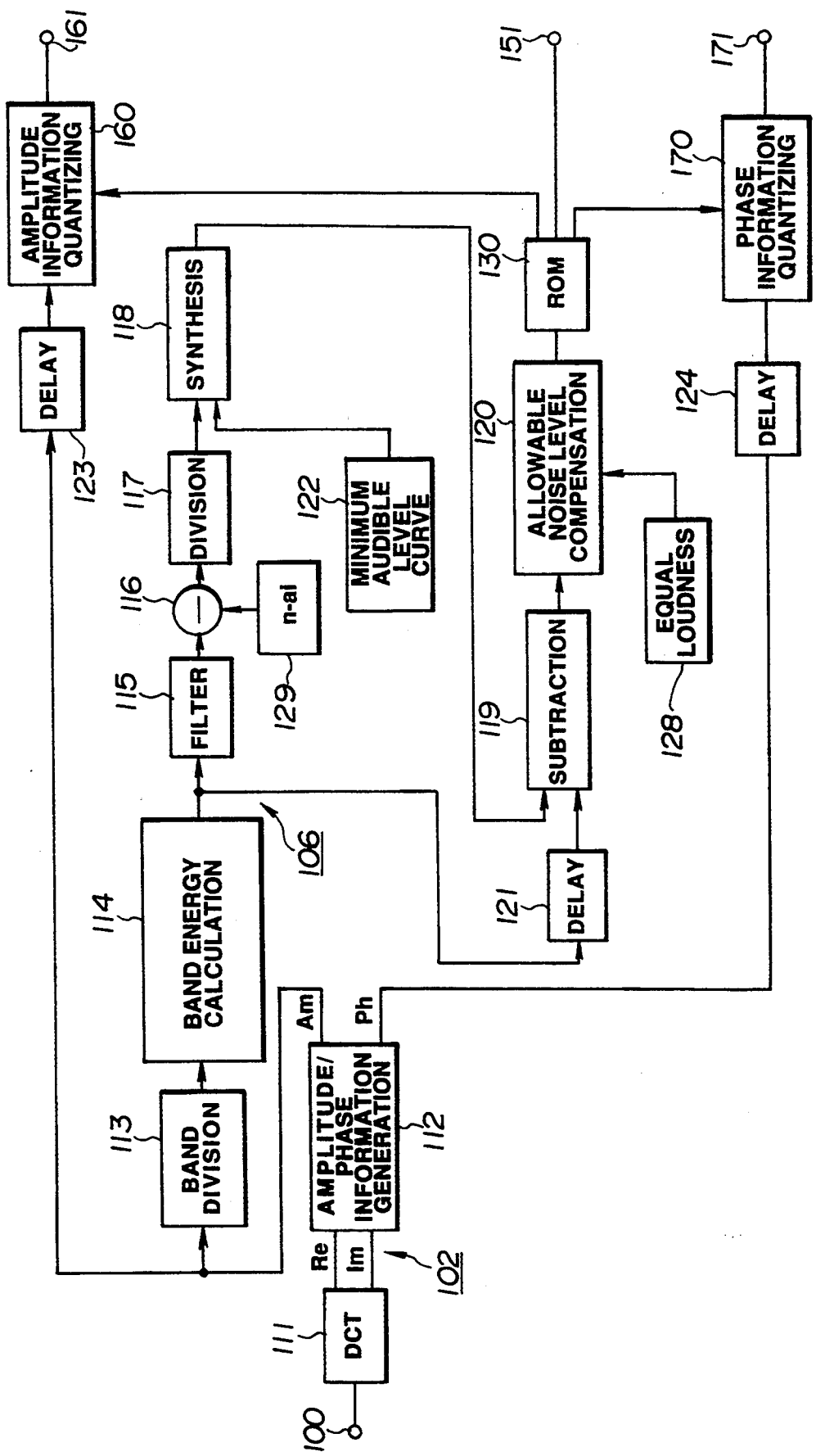
FIG. 14 is a block circuit diagram showing a detailed construction of a circuit for setting the allowable noise level.

The energy for each respective critical band from the energy calculating circuit 104 is transmitted to the masking calculating circuit 105, which calculates a masking level, taking account of the masking effect, in response to the energy for the respective frequency bands. The allowable noise level, which takes account of the so-called equal loudness curve, a characteristic of the human auditory sense, is found simultaneously with the masking calculations, as shown in FIG. 14.

As described above, the information indicating the allowable noise level for each critical band, calculated in response to the energies in the respective critical bands, and taking masking into account, is transmitted to the quantizing bit number decision circuit 106. Outputs from the block floating calculating circuit are also supplied to the quantizing bit number decision circuit 106.

In the block floating calculating circuit 107, block floating processing is carried out for each of the critical bands composed of plural spectral data points supplied from the frequency analyzing circuit 102. In the block floating processing operation, the spectral data point having the maximum level, i.e., the maximum level data point, is selected from the spectral data points in each critical band. A scale factor or the maximum level data point, which approximates the scale factor, is obtained as the block floating coefficient. The block floating coefficient is transmitted to the quantizing bit number decision circuit 106. As the approximate value of the block floating coefficient, the maximum value data point itself may be transmitted to the quantizing bit number decision circuit 106.

The quantizing bit number decision circuit 106 decides the number of quantizing bits to allocate based on the information concerning the allowable noise level found for each critical band from the masking calculating circuit 105 and the block floating coefficient.

The quantizing bit number decision circuit 106 divides the allowable noise level for each critical band from the masking calculating circuit 105 by the number of spectral data points in the respective critical band to find the allowable noise level per spectral data point in each critical band. The circuit 106 also determines the quantizing bit number information based on the allowable noise level per spectral data point and the block floating coefficient for each critical band.

When determining the number of quantizing bits to allocate, the number of spectral data points used to calculate the block floating coefficient in the block floating calculating circuit 107 is matched to the number of spectral data points used to calculate the allowable noise level in the energy calculating circuit 104 and in the masking calculating circuit 105 comprising the allowable noise level setting circuit. In other words, when deciding the number of quantizing bits to allocate, the number of processing units or blocks used in the block floating calculating circuit 107 is matched to a single processing unit or band used in the allowable noise level setting circuit to match the number of spectral data points. Alternatively, the number of the processing units or bands used for calculating the allowable noise level is matched to a processing unit or block used for calculating the block floating coefficient. The above operation is necessary because the bandwidths of the critical bands increase with increasing frequency. Hence, the number of spectral data points changes from critical band to critical band so that calculations for finding the number of quantizing bits may not be feasible unless the number of spectral data points used in calculating the block floating coefficient is matched to the number of spectral data points used to calculate the masking level.

Figure 13:
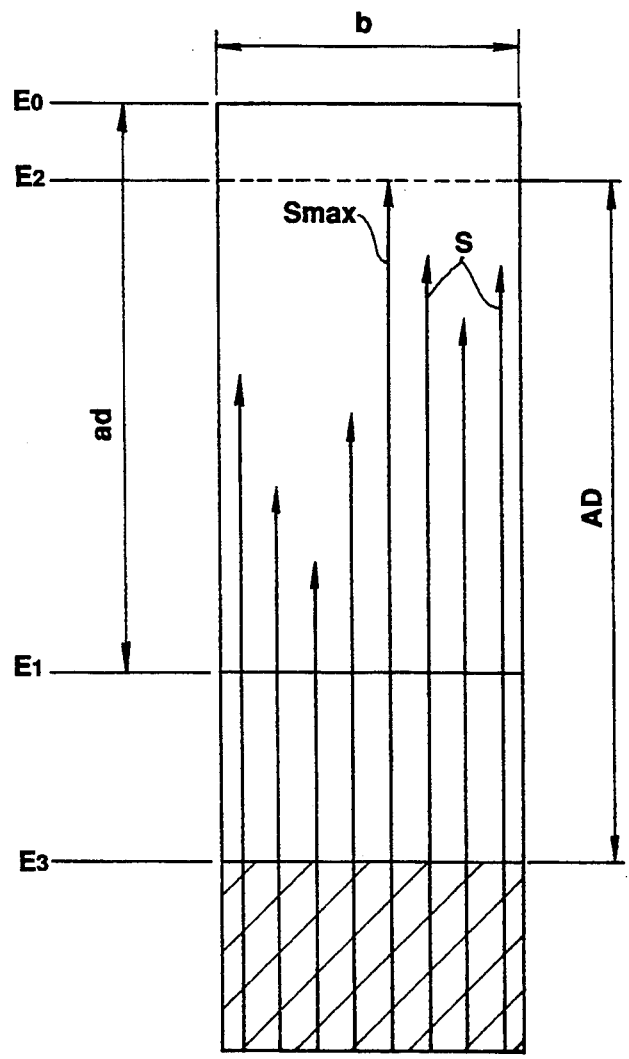
FIG. 13 is a diagrammatic view for explaining a block floating coefficient and an allowable noise level.

In the present quantizing bit number decision circuit 106, a level AD ($E_2-E_3$) is found, as shown in FIG. 13. $E_3$ is the allowable noise level per spectral data point as found by dividing the total energy level $E_0$ of the plural spectral data points S in the band b (the band in which the number of spectral data points has been matched as described above) by the number of spectral data points-s-in the band b. $E_2$ is the level of the block floating coefficient corresponding to the maximum value data point Smax among the spectral data points S in the band b, as shown in FIG. 13. The level shown in FIG. 13 is quantized using 6 bits and the level in dB, as found from ($E_2-E_3$), is calculated in terms of bits (($E_2-E_3$)/6.0 bits). The resulting data is used as the information concerning the number of quantizing bits allocated to the band b.

Alternatively, the conventional practice is to find a level ad ($E_0-E_1$) where $E_0$ is the total energy level in the band b and $E_1$ as found on the basis of the total energy level $E_0$, and to calculate the level ad in dB as found from ($E_0-E_1$) in terms of bits (($E_0-E_1$)/6.0 bits) to use the resulting data as the information concerning the quantizing bit number information for the band b.

The quantizing bit number information as found in the above-described manner is supplied to the quantizing circuit 103 where the spectral data points in the band are quantized based on the quantizing bit number information.

In the above described embodiment, the noise level in each band may be suppressed below the allowable noise level and, even if the signal is of a high tonality, the number of quantizing bits may be allocated so as to be matched to the signal character.

The information concerning the number of bits allocated by the quantizing bit number decision circuit 106 is supplied to the output terminal 109 to be used in an expander, not shown, for expanding the compressed signal. The information of the block floating coefficient from the block floating calculating circuit 107 is supplied to output terminal 110, also for use in the expander.

Referring to FIG. 14, the circuit for setting the allowable noise level taking account of critical bands and masking in the energy calculating circuit 104 and following circuits will now be explained.

The arrangement shown in FIG. 14 includes the various circuits that comprise the allowable noise level setting circuit that sets the allowable noise level for each critical band in response to the energies (or peak or mean values) in each of the critical bands.

In FIG. 14, samples of the digital audio input signal on the time axis, supplied to input terminal 100, are transmitted to the DCT circuit 111 of the frequency analyzing circuit 102, which also includes an amplitude and phase information generating circuit 112. In the DCT circuit 111, each frame or block of the digital audio input signal on the time axis is converted into spectral data points on the frequency axis, e.g., DCT coefficients, having a real number component Re and an imaginary number component Im. These DCT coefficients are transmitted to the amplitude and phase information generating circuit 112 which generates, and supplies as outputs, amplitude information Am and phase information Ph from the components Re and Im.

The amplitude information Am is transmitted to the quantizing bit number decision circuit 106 and is used to determine the adaptive quantizing bit number allocation information in the amplitude information quantizing circuit 160. The phase information Ph is transmitted to the phase information quantizing circuit 170. Since, in general, the human auditory sense is sensitive to the amplitude or power in the frequency range, while being extremely insensitive to phase, only the amplitude information Am is used in the present embodiment to find the quantizing bit number information.

The amplitude information Am from the frequency analyzing circuit 102 is transmitted to the amplitude information quantizing circuit 160 for quantizing, while the phase information Ph is supplied to the phase information quantizing circuit 170, similarly for quantizing. In quantizing by the quantizing circuits 160, 170, fewer quantizing bits are allocated to the phase information Ph than are allocated for quantizing the amplitude information Am for a predetermined critical band of the output of the frequency analyzer 102, as will be explained subsequently. The amplitude information is also supplied to the quantizing bit number decision circuit 106. The quantizing bit number decision circuit 106 decides the quantizing bit number information from the block floating coefficient and the allowable noise level per spectral data point, as will be explained below. The quantizing bit number decision circuit 106 decides on the basis of the amplitude information Am both the quantizing bit number information for quantizing the amplitude information Am and the quantizing bit number information for quantizing the phase information Ph, as will be explained below. The respective quantizing bit number information is transmitted to the corresponding quantizing circuits 160, 170.

In the quantizing bit number decision circuit 106, the amplitude information Am may be divided into critical bands to take account of the characteristics of the human auditory sense. The masking level may be found from the energies of the amplitude information Am in the respective critical bands so that the number of bits allocated for quantizing the amplitude information Am and for quantizing the phase information Ph in each critical band may be determined using the allowable noise level based on the masking level. In determining the number of bits allocated to each critical band, fewer bits are allocated to the phase information Ph are allocated to the amplitude information Am to take account of characteristics of the human auditory sense. Reducing the number of bits allocated to the phase information Ph in this manner reduces the number of bits required for the quantized phase information from the phase information quantizing circuit 170. This reduced number of bits allocated to the phase information Ph does not degrade the sound quality perceived by a listener.

In FIG. 14, spectral data points representing the amplitude information from the frequency analyzing circuit 102 are fed into the band dividing circuit 113 which divides the spectral data points into critical bands. The critical bands enable the frequency analysis characteristics of the human auditory sense to be taken into account. For example, the audio frequency range is divided into 25 critical bands, the bandwidth of which increase with increasing frequency because the human auditory sense has a frequency analysis characteristic similar to that of plural bandpass filters. Frequency bands defined by respective bandpass filters are termed critical bands.

Figure 15:
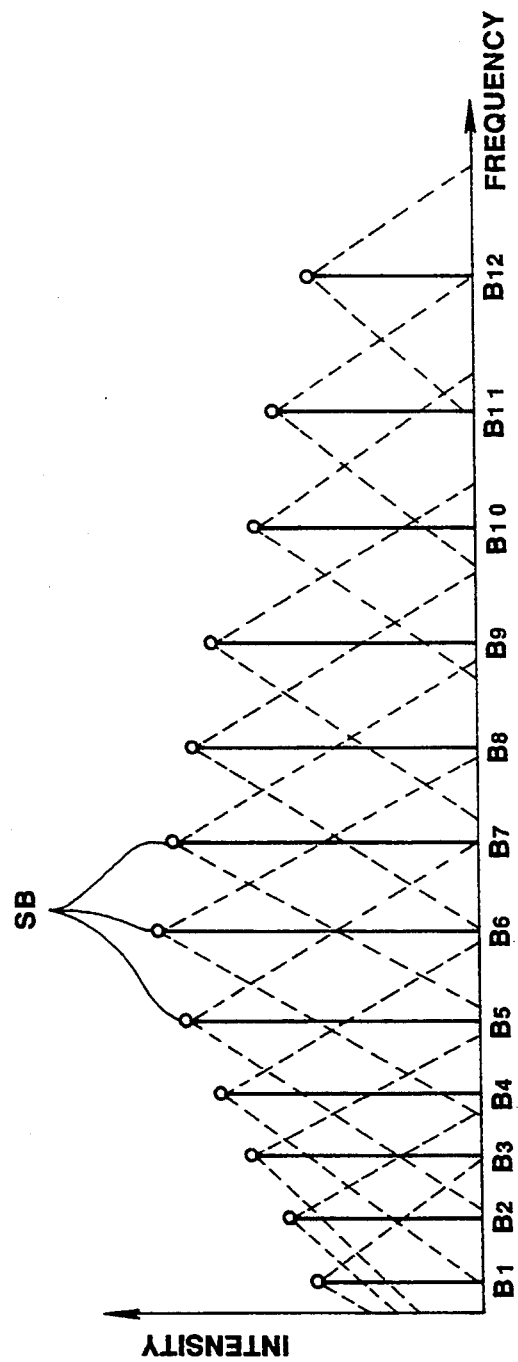
FIG. 15 is a graph showing a bark spectrum.

The spectral data points, divided into critical bands by the band dividing circuit 113, are transmitted to a band energy calculating circuit 114, in which the energy for each critical band (spectral intensity at each band) is measured by summing the intensities of the respective spectral data points in each critical band. The output of the band energy calculating circuit 114, that is, the sum of the intensities of the spectral data points in each critical band, is termed a bark spectrum. An example of a bark spectrum SB is shown in FIG. 15. In this figure, for simplicity, the number of the critical bands is selected to be equal to 12 ($B_1$ to $B_{12}$).

To take account of the effect of the bark spectrum SB on masking, a predetermined weighing function is convolved with the bark spectrum. To achieve this, the output of the band energy calculating circuit 114, that is the values of the bark spectrum SB, are fed into the filter circuit 115. The filter circuit 115 is composed of plural delay elements for sequentially delaying input data, plural multipliers, such as 25 multipliers, one for each critical band, for multiplying the outputs of the delay elements by filter coefficients (weighing functions), and a summing circuit for summing the multiplier outputs. Convolution of the bark spectrum SB is performed in the filter circuit 115 by multiplying the outputs of the delay elements by the filter coefficients 1, 0.15, 0.0019, 0.0000086, 0.4, 0.06 and 0,007 in the multipliers M, M−1, M−2, M−3, M+1, M+2 and M+3, respectively, where M is an arbitrary integer. By this convolution, the total of the area shown by broken lines in FIG. 15 is calculated.

The output of the filter circuit 115 is supplied to a subtractor 116 adapted for finding a level α corresponding to the allowable noise level in the convoluted region. The level α corresponding to the allowable noise level is the level that gives a allowable noise level for each critical band by deconvolution as will be explained below. An allowed function (a function representing the masking level) for finding the level α is supplied to the subtractor 116. The level α is controlled by increasing or decreasing the allowed function. The allowed function is supplied from the function generator 129 as will be described below.

If i is the number of the critical band, i=1 being the lowest frequency critical band, the level α corresponding to the allowable noise level is found from the formula $$a = S - (n - ai)$$

where n and a are constants, with a>0, and S is the intensity of the convolution-processed bark spectrum. The expression (n−ai) in the above formula is the allowed function. In the example of FIG. 14, n=38 and a=1 provide optimum quantizing without deterioration in sound quality.

The level α, found in the manner just described, is transmitted to the divider 117 adapted for deconvoluting the level α in the convoluted region. Thus, by deconvolution, the masking spectrum may be found from the level α. That is, the masking spectrum becomes the allowable noise level. Although deconvolution usually needs complex processing, it is carried out in the example of FIG. 14 by a simple divider 117.

Figure 16:
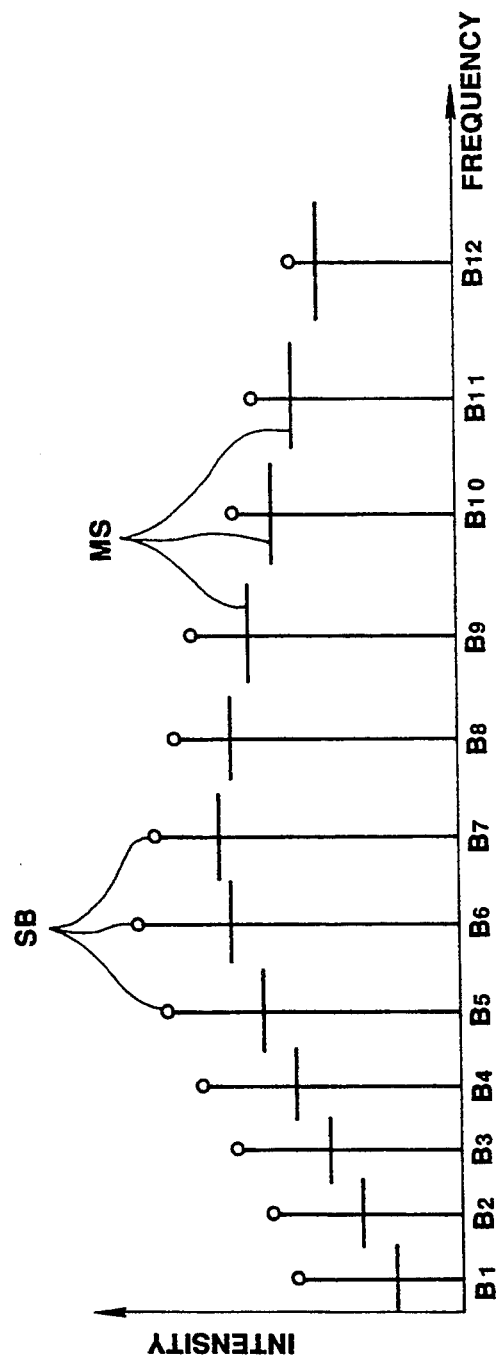
FIG. 16 is a graph showing a masking spectrum.

The masking spectrum is transmitted via the synthesis circuit 118 to the subtractor 119, which is supplied via the delay circuit 121 with the output of the band energy calculating circuit 114, that is, the bark spectrum SB. By the subtraction between the masking spectrum and the bark spectrum SB in the subtractor 119, the part of the bark spectrum SB below the masking level MS is masked, as shown in FIG. 16.

Figure 17:
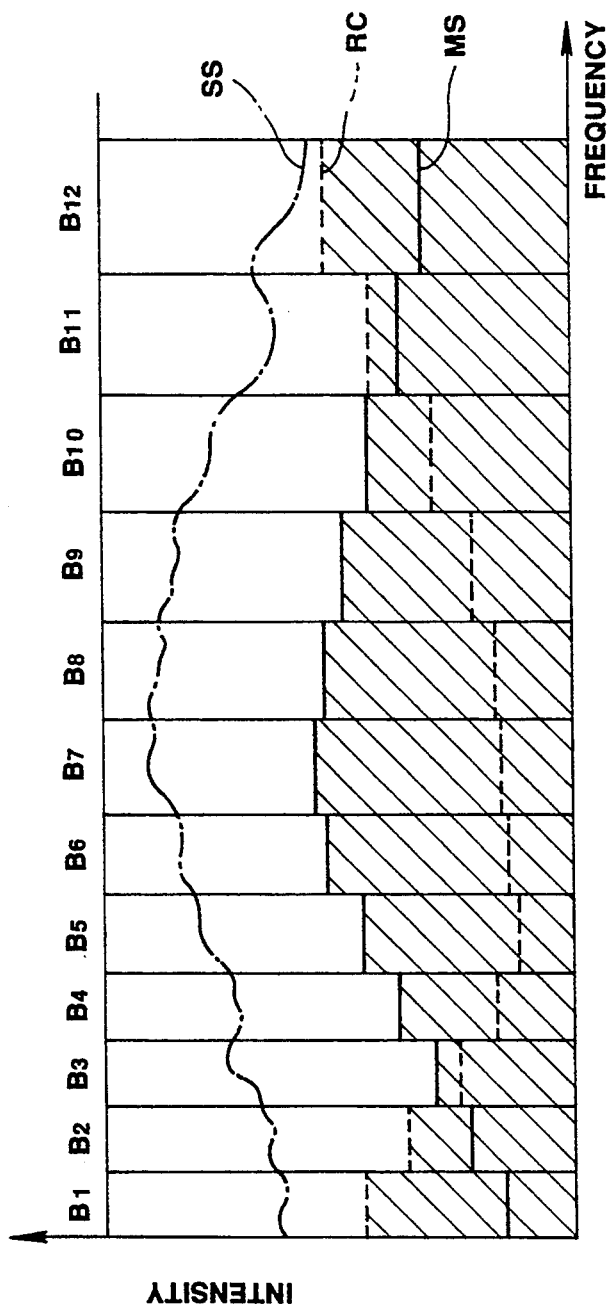
FIG. 17 is a graph showing a synthesis of the minimum audible level curve and the masking spectrum.

In the synthesis circuit 118, data indicating a minimum audible level curve RC from the minimum audible level curve generator 122, representing a further characteristic of the human auditory sense as shown in FIG. 17, is combined with the above-mentioned masking spectrum. A noise is inaudible if its absolute level is lower than the minimum audible level curve. The minimum audible level curve changes depending on the playback volume even if the quantizing remains the same. However, in a practical digital system, since there is no significant difference in the manner in which music fits within the 16-bit dynamic range, if the quantizing noise in the frequency range near 4 kHz, in which frequency range the ear is most sensitive, is inaudible, quantizing noise lower than the level of the minimum audible level curve at other frequencies can be regarded as being inaudible also. Therefore, if it is assumed that the quantizing bits are allocated such that quantizing noise near 4 kHz is inaudible, and the allowable noise level is obtained by synthesizing the minimum audible level curve RC and the masking spectrum MS, a noise level up to the hatched lines in FIG. 17 is allowable in this case. In the example of FIG. 14, the level of the minimum audible level curve at 4 kHz is matched to the minimum level corresponding to quantizing using, e.g. 20 bits. In FIG. 17, the signal spectrum SS is also shown.

The allowable noise level correcting circuit 120 corrects the allowable noise level from the subtractor 119 according to the equal loudness curve. The allowable noise level correction circuit 120 is supplied with the output of the correction circuit 128, which provide equal loudness curve data.

The equal loudness curve defines yet another characteristic of the human auditory sense, and is found by correcting the sound pressure levels of sounds at various frequencies to make them sound as loud as a pure sound at 1 kHz. The equal loudness curve is similar to the minimum audible level curve shown in FIG. 17. According to the equal loudness curve, a sound in the vicinity of 4 kHz with a sound pressure lower by 8 to 10 dB relative to a 1 kHz sound is heard with the same loudness as the 1 kHz sound. On the other hand, the sound pressure level of a sound in the vicinity of 50 Hz must be higher by about 15 dB for the 50 Hz sound to appear as loud as a 1 kHz sound. In view of this, it may be seen that the allowable noise level must be corrected to take account of the equal loudness curve to match the noise level to the characteristics of the human auditory sense.

The allowable noise level, determined as just described, is transmitted to a ROM 130 where plural quantizing bit number information for quantizing the amplitude information Am and the phase information Ph is stored. The quantizing bit number information corresponding to the corrected output of the subtraction circuit 119, i.e., the corrected difference between the energy of each critical band and the output of the allowed noise level setting circuit, is provided by the ROM 130. Fewer bits are allocated to the phase information than are allocated to the amplitude information, as described above.

The output of the ROM 130 is supplied to the amplitude information quantizing circuit 160 and to the phase information quantizing circuit 170. In the circuit 160, the amplitude information Am supplied via the delay circuit 123 is quantized using the number of bits allocated by the ROM 130, whereas the phase information Ph supplied via the delay circuit 124 is quantized in the circuit 170. In other words, in these circuits 160, 170, the amplitude and phase components are quantized using the number of bits allocated according to the difference between the energies of the critical bands and the allowable noise level. Fewer bits are allocated to the phase information Ph than are allocated to the amplitude information Am. The delay circuit 121 is provided for delaying the bark spectrum SB from the band energy calculating circuit 114 because of delays in the circuits preceding the synthesis circuit 118. The amplitude information Am and the phase information Ph are also delayed by the delay circuits 123 and 124 because of delays the circuits preceding the ROM 130.

Although the quantizing bit number information for the phase information Ph and that for the amplitude information Am may be directly supplied from the quantizing bit number decision circuit 106 to the expander circuit (not shown), the quantizing bit number information is compressed in the present embodiment.

That is, in the quantizing bit number decision circuit 106, the difference between the number of bits that are used to quantize the phase information Ph and the number of bits that are used to quantize the amplitude information Am is predetermined. For example, the number of bits allocated for quantizing the phase information Ph and the number of bits allocated for quantizing the amplitude information Am are set in advance such that the number of bits allocated for quantizing the phase information Ph in the high frequency range (e.g., 10 kHz or higher) is one bit less than the number of bits allocated for quantizing the amplitude information Am. In this manner, only quantizing bit number information for the phase information or quantizing bit number information for the amplitude information need be transmitted with the quantized phase information Ph and the quantized amplitude information Am.

If the expander is provided with information regarding the predetermined conditions of bit reduction, the expander may determine the other quantizing bit number information from the quantizing bit number information it receives. Thus the other quantizing bit number information need not be transmitted, which reduces the number of bits required for the quantizing bit number information. Moreover, if the transmitted quantizing bit number information is that for the phase information Ph, fewer bits are required to be transmitted compared with transmitting the quantizing bit number information for the amplitude information Am.

The quantized amplitude information Am from the amplitude information quantizing circuit 160 is supplied to the output terminal 161, while the quantized phase information Ph is supplied to the output terminal 171. The quantizing bit number information from the quantizing bit number decision circuit 106 is supplied to the output terminal 151. In the expander, the quantized amplitude information Am and the quantized phase information Ph are expanded using the quantizing bit number information.

With the above described apparatus, a digital input signal is converted into amplitude information Am and phase information Ph by frequency analysis. Fewer quantizing bits are allocated to the phase information Ph than to the amplitude information Am when the phase information Ph and the amplitude information Am are quantized. This reduces the number of quantizing bits required.

Additionally, if the difference between the number of quantizing bits for the phase information Ph and the number of quantizing bits for the amplitude information Am is predetermined for each critical band, only one set of the quantizing bit number information for the amplitude information Am or for the phase information Ph need be transmitted. This further reduces the number of bits required for transmitting the quantizing bit number information. Furthermore, since the number of quantizing bits allocated to each respective critical band is set using the allowable noise level based on the masking level found from the energies of the spectral data points in each critical band, data compression may be achieved in a manner that produces less degradation of the sound quality perceived by the listener.

Synthesis of the above-mentioned minimum audible level curve may be dispensed with, in which case, the minimum audible level curve generator 122 and the synthesis circuit 118 may be eliminated, and the output from the subtractor 116 directly transmitted to subtractor 119 after deconvolution by divider 117.

The present invention may be applied not only to adaptive transform coding in which the digital input signal is processed by an orthogonal transform, as in the embodiment of FIG. 12, but also to an apparatus adapted for performing sub-band coding (SBC), in which case the digital input signal is divided into plural frequency bands by bandpass filters etc. for determining the number of quantizing bits allocated to each band.

In the present apparatus for compressing a digital input signal, the block lengths for the orthogonal transform circuits for the respective frequency ranges are determined in the block length decision circuit based on the dynamic characteristics (transient or static, etc.) of the digital signal in the frame prior to carrying out the orthogonal transform of each frequency range signal. The orthogonal transform is carried out in each frequency range with the thus-determined block length. This enables quantizing to be carried out in conformity to signal dynamic characteristics, such as transient or static, while also providing signal compression.

In the present apparatus for compressing a digital input signal, only one of the outputs from the respective orthogonal transform circuits is selected, based on the output of the plural orthogonal transform circuits. An optimally-quantized output is obtained in conformity to the dynamic characteristics of the digital input signal and characteristics of human auditory sense by selecting the output of the orthogonal transform circuits having the least number of quantizing bits so that optimum sound quality may be produced by decoding and converting the decoded output into sound.

Additionally, in the present apparatus for compressing a digital input signal, since the number of quantizing bits is determined on the basis of the block floating coefficient based on the maximum value data in each critical band of spectral data points obtained by frequency analysis of the digital input signal and the allowable noise level based on the energy in each critical band, optimum bit allocation may be achieved even if input signal is highly tonal.

Moreover, with the present apparatus for compressing a digital input signal, when the digital input signal is converted into the amplitude information and the phase information by frequency analysis and the amplitude information and the phase information are quantized, fewer quantizing bits are allocated to the phase information for a predetermined critical band or bands than to the amplitude information, so that the compression ratio may be raised and the transmission bit rate may be reduced.

In addition, with the present apparatus for compressing a digital input signal, since the critical bands in which fewer quantizing bits are allocated for the phase information Ph are high frequency critical bands, which takes account of the characteristics of the human auditory sense, sound quality degradation perceived by the listener may be reduced.

The apparatus of the present invention may be applied effectively to an apparatus for compressing a digital input signal to provide a compressed digital recording signal for recording on a package medium, such as a compact disc.

What is claimed is:

1. An apparatus for compressing a digital input signal divided into frames of plural samples to provide a compressed signal, the apparatus comprising:
   plural orthogonal transform means for orthogonally transforming the digital input signal in blocks derived by dividing each frame by a different set of divisors, each set of divisors including at least one divisor, each orthogonal transform means deriving spectral coefficients from the digital input signal, quantizing the spectral coefficients by adaptively allocating a number of quantizing bits among the spectral coefficients, each orthogonal transform means allocating an equal number of quantizing bits, and providing the quantized spectral coefficients as an output signal; and
   means for selecting the output signal from one of the orthogonal transform means as the compressed signal in response to a selection signal from each of the orthogonal transform means.

2. An apparatus for compressing a digital input signal according to claim 1, wherein:
   the apparatus additionally includes means for dividing the digital input signal in frequency into plural frequency range signals,
   at least one of the orthogonal transform means transforms each frequency range signal, and
   the orthogonal transform means transforming a frequency range signal towards higher frequencies transforms the frequency range signal in blocks derived by dividing by a greater divisor than orthogonal transform means transforming a frequency range signal towards lower frequencies.

3. An apparatus for compressing a digital input signal according to claim 1, wherein:
   each orthogonal transform means quantizes the spectral coefficients using a primary number of bits and provides as the selection signal information indicating the primary number of bits; and
   the selection means selects as the compressed signal the output signal from the orthogonal transform means providing the selection signal indicating the least primary number of bits.

4. A method according to claim 3, wherein:
   in the step of quantizing the spectral coefficients, the spectral coefficients from each orthogonal transform are initially quantized using a primary number of bits, and information indicating the primary number of bits is provided as the selection signal; and
   the step of selecting the output signal from one of the orthogonal transforms selects the output signal from the orthogonal transform providing the selection signal indicating the least primary number of bits.

5. An apparatus for compressing a digital input signal according to claims 1 or 2, wherein each orthogonal transform means performs a discrete cosine transform.

6. An apparatus for compressing a digital input signal according to claims 1 or 2, wherein each orthogonal transform means performs a fast Fourier transform.

7. An apparatus for compressing a digital input signal to provide a compressed signal, the apparatus comprising:
   means for dividing the digital input signal into plural frequency ranges to provide plural frequency range signals, each frequency range signal being arranged into frames composed of plural samples;
   a block length decision means for dynamically determining a division of each frame of each frequency range signal into at least one block in response to a dynamic characteristic of the frame of the frequency range signal;
   orthogonal transform means for orthogonally transforming each frequency range signal to produce spectral coefficients, the orthogonal transforms means transforming each frequency range signal in blocks determined by the block length decision means; and
   means for quantizing the spectral coefficients.

8. An apparatus for compressing a digital input signal according to claim 7, wherein:
   each frequency range has a bandwidth, and
   the means for dividing the digital input signal into plural frequency ranges divides the digital input signal such that the bandwidths of the frequency ranges are wider towards higher frequencies.

9. An apparatus for compressing a digital input signal according to claim 4, wherein the block length decision means dynamically determines the division of each frame into at least one block such that the frames of the frequency range signals are divided into a number of blocks up to a maximum number of blocks, the maximum number of blocks for frequency range signals towards higher frequencies being greater than the maximum number of blocks for the frequency range signals towards lower frequencies.

10. An apparatus for compressing a digital input signal according to claim 8, wherein:
   the frequency range signals include a middle frequency range signal and a higher frequency range signal, and
   the block length decision means dynamically determines a division of the frames of the middle frequency range signal into blocks and independently dynamically determines a division of the frames of the high frequency range signal into blocks.

11. An apparatus for compressing a digital input signal according to claims 3, 4, 5 or 6, wherein the orthogonal transform means performs a discrete cosine transform.

12. An apparatus for compressing a digital input signal according to claims 7, 8, 9 or 10, wherein the orthogonal transform means performs a fast Fourier transform.

13. A apparatus for compressing a digital input signal, apparatus comprising:
   frequency analyzing means for frequency analyzing the digital input signal to provide plural spectral data points and for forming the spectral data points into plural bands;
   allowable noise level setting means for determining an energy for each band, and for setting an allowable noise level in response to the energy in each band;
   block floating coefficient calculating means for calculating a block floating coefficient in response to a maximum spectral data point in each band;
   quantizing bit number decision means for determining a number of quantizing bits in response to the allowable noise level and the block floating coefficient: and
   quantizing means for quantizing the spectral data points from the frequency analyzing means using the number of quantizing bits determined by the quantizing bit number decision means.

14. An apparatus for compressing a digital input signal according to claim 13, wherein the allowable noise level setting means:
   is additionally for calculating a masking level from the energy in each band, and
   sets the allowable noise level in response to the masking level.

15. An apparatus for compressing a digital input signal according to claim 14, wherein the allowable noise level setting means calculates the masking level taking account of an equal loudness characteristic of human auditory sense.

16. An apparatus for compressing a digital input signal according to claims 13, 14 or 15, wherein the frequency analyzing means performs a discrete cosine transform.

17. An apparatus for compressing a digital input signal according to claims 9, 10 or 11, wherein the frequency analyzing means performs a fast Fourier transform.

18. In combination, a compressor apparatus for compressing a digital input signal comprising plural samples to provide a compressed signal, and an expander apparatus for applying complementary expansion to the compressed signal to provide a digital output signal, the compressor comprising:
   means for arranging the digital input signal in frames of plural samples,
   means for dividing the digital input signal data into plural frequency ranges to provide plural frequency range signals,
   means for orthogonally transforming each frequency range signal to provide spectral coefficients, each frequency range signal being transformed by dynamically dividing each frame of the frequency range signal into blocks having a block length determined in response to a dynamic characteristic of the frame of the frequency range signal, and
   means for quantizing the spectral coefficients using an adaptive bit allocation,
   means for including in the compressed signal the quantized spectral coefficients and subsidiary information indicating the adaptive bit allocation; and
   the expander comprising:
      means for extracting the quantized spectral coefficients and the subsidiary information from the compressed signal,
      means for dequantizing the quantized spectral coefficients in response to the subsidiary information indicating the adaptive bit allocation to provide plural spectral coefficients,
      means, including a reverse orthogonal transform circuit, for transforming the spectral coefficients into frequency range signals, and
      means, including an inverse band division filter, for synthesizing the frequency range signals to produce the digital output signal.

19. A combination according to claim 18 wherein the reverse orthogonal transform circuit is a reverse discrete cosine transform circuit.

20. A combination according to claim 18 wherein each the inverse band division filter includes a reverse quadrature mirror filter circuit.

21. A method for storing in a medium a compressed digital signal derived from a digital input signal divided into frames of plural samples, the method comprising the steps of:
   performing plural orthogonal transforms of the digital input signal each orthogonal transform:
      orthogonally transforming the digital input signal in blocks derived by dividing a frame of the digital input signal by a different set of divisors, each set of divisors including at least one divisor to provide spectral coefficients,
      quantizing the spectral coefficients by adaptively allocating a number of quantizing bits among the spectral coefficients using an adaptive bit allocation, each orthogonal transform adaptively allocating an equal number of quantizing bits and
      providing the quantized spectral coefficients as an output signal for the orthogonal transform;
   selecting, as the part of the compressed signal, the output signal for one of the orthogonal transforms in response to a selection signal for each orthogonal transform;
   including subsidiary information indicating the adaptive bit allocation in the compressed signal; and
   storing the compressed signal in the medium.

22. A method according to claim 21, wherein:
   the method additionally includes the step of dividing the digital input signal in frequency into plural frequency range signals; and
   in the step of performing plural orthogonal transforms:
      at least one orthogonal transform is performed on each frequency range signal, orthogonal transforms performed on frequency range signals towards higher frequencies are performed on blocks derived by dividing each frame by a greater divisor than orthogonal transforms performed on frequency range signals towards lower frequencies.

23. A method for storing in a medium a compressed digital signal derived from a digital input signal, the method comprising the steps of:

dividing the digital input signal into plural frequency ranges to provide plural frequency range signals, each frequency range signal being arranged into frames of plural samples;

dynamically determining a division of each frame of each frequency range signal into blocks in response to a dynamic characteristic of the frame of the frequency range signal;

orthogonally transforming each frequency range signal in blocks determined by the determining step to produce spectral coefficients;

quantizing the spectral coefficients using an adaptive bit allocation;

including the quantized spectral coefficients and subsidiary information indicating the adaptive bit allocation in the compressed digital signal; and storing the compressed digital signal in the medium.

24. A method according to claim 23, wherein, in the step of dividing the digital input signal into plural frequency ranges, the digital input signal is divided into frequency ranges, each having a bandwidth, such that the bandwidths of the frequency ranges widen towards higher frequencies.

25. A method according to claim 24, wherein, in the step of determining a division of each frame of each frequency range signal into blocks, the frames of the frequency range signals are divided into a number of blocks up to a maximum number of blocks, the maximum number of blocks for frequency range signals towards higher frequencies being greater than the maximum number of blocks for frequency range signals towards lower frequencies.

26. A method for storing in a medium a compressed digital signal derived from a digital input signal, the method comprising the steps of:

frequency analyzing the digital input signal to provide plural spectral data points;

forming the spectral data points into plural bands;

determining an energy for each band;

setting an allowable noise level in response to the energy in each band;

calculating a block floating coefficient for each band in response to a maximum level spectral data point in the band;

determining a number of quantizing bits for each band in response to the allowable noise level and the block floating coefficient for the band;

quantizing the spectral data points in each band using the number of quantizing bits determined in the step of determining the number quantizing bits:

including the quantized spectral data points and subsidiary information indicating the number of quantizing bits for each band in the compressed digital signal; and storing the compressed digital signal in the medium.

27. A method according to claim 26, wherein the step of setting the allowable noise level includes the steps of:

calculating a masking level from the energy in each band, and setting the allowable noise level in response to the masking level.

28. A method according to claim 27, wherein the step of calculating the masking level takes account of an equal loudness characteristic of human auditory sense.

29. A method according to claim 26, wherein the step of frequency analyzing the digital input signal includes the step of orthogonally transforming the digital input signal.

* * * * *